(12) United States Patent
Takami et al.

(10) Patent No.: US 6,465,125 B1
(45) Date of Patent: Oct. 15, 2002

(54) NONAQUEOUS ELECTROLYTE SECONDARY BATTERY AND METHOD OF MANUFACTURING NONAQUEOUS ELECTROLYTE SECONDARY BATTERY

(75) Inventors: Norio Takami, Yokohama; Hiroyuki Hasebe, Chigasaki; Takahisa Osaki; Motoya Kanda, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/397,096

(22) Filed: Sep. 16, 1999

(30) Foreign Application Priority Data

Sep. 17, 1998 (JP) .......................................... 10-262891
Dec. 28, 1998 (JP) .......................................... 10-372385

(51) Int. Cl.[7] ............................................. H01M 10/12
(52) U.S. Cl. ....................... 429/127; 429/129; 429/232; 429/236; 429/247; 429/248
(58) Field of Search ................................. 429/127, 129, 429/232, 236, 247, 248

(56) References Cited

U.S. PATENT DOCUMENTS

| | | | |
|---|---|---|---|
| 5,437,692 A | | 8/1995 | Dasgupta et al. |
| 5,443,925 A | | 8/1995 | Machida et al. |
| 5,512,389 A | | 4/1996 | Dasgupta et al. |
| 5,603,737 A | * | 2/1997 | Marincic et al. .............. 29/23.1 |
| 5,741,609 A | | 4/1998 | Chen et al. |
| 5,989,743 A | * | 11/1999 | Yamashita ................... 429/129 |
| 6,124,061 A | * | 9/2000 | Hamano et al. ............. 429/316 |
| 6,225,010 B1 | * | 5/2001 | Hamano et al. ............. 429/306 |

FOREIGN PATENT DOCUMENTS

| | | |
|---|---|---|
| EP | 0 851 522 | 7/1998 |
| EP | 0 862 236 | 9/1998 |
| GB | 2 122 413 | 1/1984 |

* cited by examiner

*Primary Examiner*—Carol Chaney
*Assistant Examiner*—Dah-Wei D. Yuan
(74) *Attorney, Agent, or Firm*—Oblon, Spivak, McClelland, Maier & Neustadt, P.C.

(57) ABSTRACT

This invention provides a nonaqueous electrolyte secondary battery including an electrode group comprising a positive electrode, a negative electrode, and a separator for separating the positive and negative electrodes from each other, a jacket for housing the electrode group, and a nonaqueous electrolyte with which the electrode group is impregnated. The separator contains a porous sheet whose air permeability is 600 sec/100 cm$^3$ or less. The positive electrode and the separator are adhered to each other by adhesive polymers that are held in voids of the positive electrode and those of the separator, and the negative electrode and the separator are adhered to each other by adhesive polymers that are held in voids of the negative electrode and those of the separator.

31 Claims, 4 Drawing Sheets

NONAQUEOUS ELECTROLYTE SECONDARY BATTERY AND METHOD OF MANUFACTURING NONAQUEOUS ELECTROLYTE SECONDARY BATTERY

BACKGROUND OF THE INVENTION

The present invention relates to a nonaqueous electrolyte secondary battery and a method of manufacturing the nonaqueous electrolyte secondary battery.

Recently, a thin lithium ion secondary battery has been put on the market as a nonaqueous electrolyte secondary battery for portable apparatuses such as portable phones. This battery uses lithium cobalt oxide (e.g., $LiCoO_2$) as a positive electrode active material, a graphite material or carbonaceous material as a negative electrode active material, an organic solvent in which a lithium salt is dissolved as an electrolyte, and a porous film as a separator.

Although it is being demanded to decrease the thickness of batteries to meet decreasing thickness of portable apparatuses, thin lithium ion secondary batteries 4 mm or less in thickness are difficult to put to practical use. Therefore, a card-type lithium secondary battery using a polymer electrolyte has been conventionally proposed and developed to be commercially practical.

A lithium secondary battery using a polymer electrolyte, however, contains a gelled polymer holding a nonaqueous electrolyte. Hence, this lithium secondary battery has larger electrode interface impedance and lower lithium ion conductivity than those of a lithium secondary battery using a nonaqueous electrolyte. Also, the thickness of the polymer electrolyte should be increased compared with the separator to raise its strength, and as a result the energy density lowers.

Accordingly, a lithium secondary battery using a polymer electrolyte is inferior, in volume energy density, cycle life and large discharge characteristic, to a thin lithium secondary battery impregnated with a nonaqueous electrolyte in a solution or liquid form.

The scope of claims of Jpn. Pat. Appln. KOKAI Publication No. 10-177865 describes a lithium ion secondary battery including a positive electrode, a negative electrode, a separator which have opposing surfaces holding an electrolyte in place, and an adhesive resin layer which is made from a mixed phase of an electrolyte phase, a polymer gel phase containing an electrolyte, and a polymer solid phase and adheres the positive and negative electrodes to the opposing surfaces of the separator. The scope of claims of Jpn. Pat. Appln. KOKAI Publication No. 10-189054 describes a lithium ion secondary battery manufacturing method including the steps of coating a separator with a binder resin solution prepared by dissolving polyvinylidene fluoride as a main component in a solvent, putting an electrode on this separator and drying these materials, as they are adhered to each other, to evaporate the solvent and thereby form a battery stacked body, and impregnating this battery stacked body with an electrolyte. Also, the scope of claims of Jpn. Pat. Appln. KOKAI Publication No. 10-172606 describes a lithium ion secondary battery including a positive electrode, a negative electrode, a separator inserted between the positive and negative electrodes and holding an electrolyte containing lithium ions, and a porous adhesive resin layer for holding the electrolyte and adhering the positive electrode, negative electrode, and separator.

Unfortunately, the lithium ion secondary batteries disclosed in these patent publications have high internal resistance and are therefore inferior in cycle life and large discharge characteristic.

BRIEF SUMMARY OF THE INVENTION

It is an object of the present invention to provide a nonaqueous electrolyte secondary battery in which an electrode group is impregnated with a nonaqueous electrolyte in a solution or liquid form, and which has an improved large discharge characteristic and cycle characteristic and can be made thin.

It is another object of the present invention to provide a nonaqueous electrolyte secondary battery manufacturing method capable of improving the large discharge characteristic and cycle characteristic and decreasing the thickness of a nonaqueous electrolyte secondary battery in which an electrode group is impregnated with a nonaqueous electrolyte in a solution or liquid form.

It is still another object of the present invention to provide a nonaqueous electrolyte secondary battery in which an electrode group is impregnated with a nonaqueous electrolyte in a solution or liquid form, and which has an improved cycle characteristic and can be made thin.

It is still another object of the present invention to provide a nonaqueous electrolyte secondary battery manufacturing method capable of improving the cycle characteristic and decreasing the thickness of a nonaqueous electrolyte secondary battery in which an electrode group is impregnated with a nonaqueous electrolyte in a solution or liquid form.

It is still another object of the present invention to provide a nonaqueous electrolyte secondary battery having a reduced internal short circuit occurrence frequency and an improved large discharge characteristic and cycle characteristic.

According to the present invention, there is provided a nonaqueous electrolyte secondary battery comprising an electrode group comprising a positive electrode, a negative electrode, and a separator which is interposed between the positive electrode and the negative electrode and which contains a porous sheet whose air permeability is 600 $sec/100\ cm^3$ or less, a nonaqueous electrolyte with which the electrode group is impregnated, and a jacket for housing the electrode group, wherein the positive electrode and the separator are adhered to each other by adhesive polymers that are held in voids of the positive electrode and those of the separator, and the negative electrode and the separator are adhered to each other by adhesive polymers that are held in voids of the negative electrode and those of the separator.

According to the present invention, there is provided a nonaqueous electrolyte secondary battery comprising an electrode group comprising a positive electrode, a negative electrode, and a separator for separating the positive and negative electrodes from each other, a jacket for housing the electrode group, and a nonaqueous electrolyte with which the electrode group is impregnated, wherein the positive electrode and the separator are adhered to each other by adhesive polymers that are dispersedly present in the positive electrode and the separator and in a boundary between the positive electrode and the separator, and the negative electrode and the separator are adhered to each other by adhesive polymers that are dispersedly present in the negative electrode and the separator and in a boundary between the negative electrode and the separator.

According to the present invention, there is provided a nonaqueous electrolyte secondary battery comprising an electrode group having a structure formed by spirally winding a positive electrode and a negative electrode with a separator interposed between them and compressing a resultant coil in a direction of diameter, a nonaqueous electrolyte with which the electrode group is impregnated, and a film jacket in which the electrode group is housed, and a surface of the electrode group to which a stacked structure is exposed has a shape meeting:

$$0.9 \leq L_2/L_1 \leq 1.2 \qquad (I)$$

wherein $L_2$ is a thickness of a most multilayered portion in a region of the surface except curved-layer-regions and $L_1$ is a thickness of an end portion which is one of end portions of the region except the curved-layer-regions and is equal in number of layers to $L_2$.

According to the present invention, there is provided a nonaqueous electrolyte secondary battery comprising an electrode group having a structure formed by folding a positive electrode and a negative electrode twice or more with a separator interposed therebetween, a nonaqueous electrolyte with which the electrode group is impregnated, and a film jacket in which the electrode group is housed, and a surface of the electrode group to which a stacked structure is exposed has a shape meeting:

$$0.9 \leq L_4/L_3 \leq 1.2 \qquad (II)$$

wherein $L_4$ is a thickness of a most multilayered portion in a region of the surface except folded-layer-regions and $L_3$ is a thickness of an end portion which is one of end portions of the region except the folded-layer-regions and is equal in number of layers to $L_4$.

According to the present invention, there is provided a nonaqueous electrolyte secondary battery comprising an electrode group having a structure formed by spirally winding a positive electrode and a negative electrode with a separator interposed therebetween and compressing a resultant coil in a direction of diameter, a nonaqueous electrolyte with which the electrode group is impregnated, and a film jacket in which the electrode group is housed, wherein the positive electrode and the separator are adhered to each other by adhesive polymers that are dispersedly present in the positive electrode and the separator and in a boundary between the positive electrode and the separator, and the negative electrode and the separator are adhered to each other by adhesive polymers that are dispersedly present in the negative electrode and the separator and in a boundary between the negative electrode and the separator, and a surface of the electrode group to which a stacked structure is exposed has a shape meeting:

$$0.9 \leq L_2/L_1 \leq 1.2 \qquad (I)$$

wherein $L_2$ is a thickness of a most multilayered portion in a region of the surface except curved-layer-regions and $L_1$ is a thickness of an end portion which is one of end portions of the region except the curved-layer-regions and is equal in number of layers to $L_2$.

According to the present invention, there is provided a nonaqueous electrolyte secondary battery comprising an electrode group having a structure formed by folding a stack comprising a positive electrode, a negative electrode, and a separator not less than twice, a nonaqueous electrolyte with which the electrode group is impregnated, and a film jacket in which the electrode group is housed, wherein the positive electrode and the separator are adhered to each other by adhesive polymers that are dispersedly present in the positive electrode and the separator and in a boundary between the positive electrode and the separator, and the negative electrode and the separator are adhered to each other by adhesive polymers that are dispersedly present in the negative electrode and the separator and in a boundary between the negative electrode and the separator, and a surface of the electrode group to which a stacked structure is exposed has a shape meeting:

$$0.9 \leq L_4/L_3 \leq 1.2 \qquad (II)$$

wherein $L_4$ is a thickness of a most multilayered portion in a region of the surface except folded-layer-regions and $L_3$ is a thickness of an end portion which is one of end portions of the region except the folded-layer-regions and is equal in number of layers to $L_4$.

According to the present invention, there is provided a nonaqueous electrolyte secondary battery comprising an electrode group comprising a stack comprising at least one positive electrode, at least one negative electrode, at least one separator, and at least two adhesive layers, one interposed between the positive electrode and the separator and another between the negative electrode and the separator, a nonaqueous electrolyte with which the electrode group is impregnated, and a film jacket in which the electrode group is housed, wherein the at least one separator contains 10 wt % or less (including 0 wt %) of an adhesive polymer, and an end portion of the separator protrudes compared with an end portion of the at least one positive electrode or an end portion of the at least one negative electrode.

According to the present invention, there is provided a method of manufacturing a nonaqueous electrolyte secondary battery, comprising the steps of forming an electrode group by interposing a separator between a positive electrode and a negative electrode, impregnating the electrode group with a solution in which an adhesive polymer is dissolved, molding the electrode group, and impregnating the electrode group with a nonaqueous electrolyte.

According to the present invention, there is provided a method of manufacturing a nonaqueous electrolyte secondary battery, comprising the steps of forming an electrode group by interposing a separator made from at least one type of material selected from polyolefin and cellulose between a positive electrode and a negative electrode, molding the electrode group while heating, and impregnating the electrode group with a nonaqueous electrolyte.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
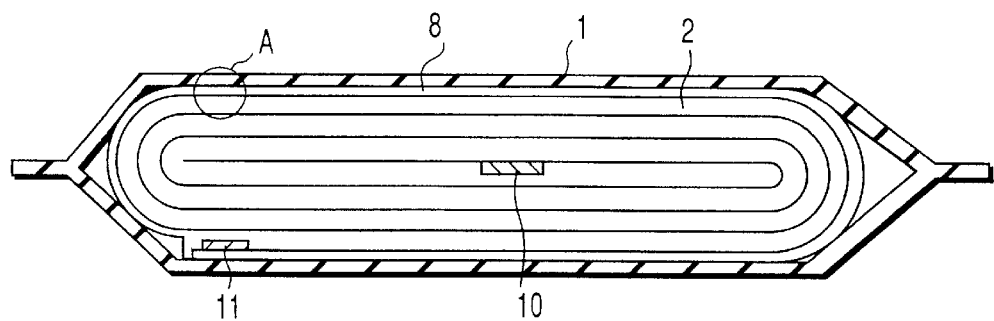
FIG. 1 is a sectional view showing an example of the first and second nonaqueous electrolyte secondary battery according to the present invention.

The first nonaqueous electrolyte secondary battery according to the present invention comprises an electrode group constructed of a positive electrode, a negative electrode, and a separator which is located between the positive electrode and the negative electrode and contains a porous sheet whose air permeability is 600 sec/100 cm$^3$ or less, a nonaqueous electrolyte with which the electrode group is impregnated, and a jacket in which the electrode group is housed.

The positive electrode and the separator are adhered to each other by adhesive polymers that are held in voids of the positive electrode and those of the separator, and the negative electrode and the separator are adhered to each other by adhesive polymers that are held in voids of the negative electrode and those of the separator.

The second nonaqueous electrolyte secondary battery according to the present invention comprises an electrode group constructed of a positive electrode, a negative electrode, and a separator for electrically separating the positive electrode and the negative electrode from each other, a jacket for housing the electrode group, and a nonaqueous electrolyte with which the electrode group is impregnated.

The positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator.

If at least one of the positive and negative electrodes is constructed of a plurality of electrodes, the adhesive polymer is desirably present in a portion of the boundary between each of these electrodes and the separator, rather than in the boundary between one of these electrodes and the separator.

Details of the positive electrode, negative electrode, separator, nonaqueous electrolyte, and jacket will be described below.

1) Positive Electrode

This positive electrode has a structure in which an electrode layer containing an active material is carried by one or both surfaces of the collector. The positive electrode holds adhesive polymers in voids. The positive electrode layer preferably further contains a conducting agent and a binder.

Examples of the positive electrode active material are various oxides such as manganese dioxide, lithium manganese composite oxide, lithium-containing nickel oxide, lithium-containing cobalt oxide, lithium-containing nickel cobalt oxide, lithium-containing iron oxide, and lithium-containing vanadium oxide, and chalcogen compounds such as titanium disulfide and molybdenum disulfide. Of these materials, lithium-containing cobalt oxide (e.g., $LiCoO_2$), lithium-containing nickel cobalt oxide (e.g., $LiNi_{0.8}Co_{0.2}O_2$), and lithium manganese composite oxide (e.g., $LiMn_2O_4$ and $LiMnO_2$) are preferably used because high voltage can be obtained.

Examples of this conducting agent are one or more types of carbon materials selected from acetylene black, carbon black, and graphite. The content of this conducting agent in the positive electrode is preferably 3 to 20 wt % when the content of the positive electrode active material is 80 to 95 wt %.

The binder has functions of allowing the collector to hold the active material in place and binding particles of the active material to each other. As this binder, it is possible to use one or more types of polymers selected from polytetrafluoroethylene (PTFE), ethylene-propylene-diene copolymer (EPDM), styrene-butadiene rubber (SBR), and polyvinylidene fluoride (PVdF).

As the adhesive polymer, it is possible to use one or more types of polymers selected from polyacrylonitrile (PAN), polyacrylate (PMMA), polyvinylidene fluoride (PVdF), polyvinyl chloride (PVC), and polyethylene oxide (PEO). This adhesive polymer desirably can keep being highly adhesive while holding the nonaqueous electrolyte in place. This polymer more preferably has high lithium ion conductivity. PAN, PMMA, PVdF, PVC, and PEO are examples of the polymer that is highly adhesive while holding the nonaqueous electrolyte in place and has high lithium ion conductivity. Of these polymers, PVdF is most preferred. PVdF can hold the nonaqueous electrolyte in place and partially gels in the presence of the nonaqueous electrolyte. This further improves the ion conductivity of the positive electrode.

The adhesive polymer preferably takes a porous structure in the positive electrode. This adhesive polymer having a porous structure can hold the nonaqueous electrolyte in place and can increase the amount of nonaqueous electrolyte held in place in the positive electrode.

The total content of the adhesive polymer and the binder in the positive electrode is preferably 1 to 10 wt %.

As the collector, a porous conductive substrate or a conductive substrate having no pores can be used. These conductive substrates can be made from, e.g., aluminum, stainless steel, or nickel.

As this collector, it is particularly preferable to use a conductive substrate having a two-dimensional porous structure in which pores 3 mm or less in diameter exist at a ratio of one or more pores per 10 cm$^2$. That is, if the diameter of the pores formed in the conductive substrate is larger than 3 mm, no satisfactory positive electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm$^2$.

The conductive substrate having a two-dimensional porous structure in which pores 3 mm or less in diameter exist at a ratio of one or more pores per 10 cm$^2$ preferably has a thickness of 15 to 100 μm. If the thickness is less than 15 μm, no satisfactory positive electrode strength may be obtained. If the thickness exceeds 100 μm, the battery weight and the electrode group thickness increase. This may make it difficult to well increase the weight energy density and volume energy density of the thin secondary battery. A more favorable range of the thickness is 30 to 80 μm.

2) Negative Electrode

The negative electrode has a structure in which an electrode layer containing an active material is carried by one or both surfaces of the collector. The negative electrode holds adhesive polymers in voids. The negative electrode layer preferably further contains a binder.

An example of the active material is a carbonaceous material which absorbs and desorbs lithium ions. Examples of this carbonaceous material are graphite, coke, carbon fibers, spherical carbon, and a material obtained by heat-treating a thermosetting resin, isotropic pitch, mesophase pitch, mesophase pitch-based carbon fibers, and mesophase globules (mesophase pitch-based carbon fibers are particularly preferred) at 500 to 3,000° C. Of these materials, it is preferable to use a graphite material obtained by heat-treating at 2,000° C. or more and having a graphite crystal in which an interplanar spacing $d_{002}$ derived from (002) reflection is 0.340 nm or less. It is possible to greatly improve the battery capacity and large discharge characteristic of a nonaqueous electrolyte secondary battery including a negative electrode containing this graphite material as a carbonaceous substance. The interplanar spacing $d_{002}$ is more preferably 0.336 nm or less.

The content of the carbonaceous material in the negative electrode is preferably 5 to 20 g/m$^2$ when the negative electrode is manufactured.

The binder has functions of allowing the collector to hold the active material in place and binding particles of the active material to each other. As this binder, it is possible to use one or more types of polymers selected from polytetrafluoroethylene (PTFE), ethylene-propylene-diene copolymer (EPDM), styrene-butadiene rubber (SBR), carboxymethylcellulose (CMC), and polyvinylidene fluoride (PVdF).

The adhesive polymer desirably can keep being highly adhesive while holding the nonaqueous electrolyte in place. This polymer more preferably has high lithium ion conductivity. Examples of the polymer that is highly adhesive while holding the nonaqueous electrolyte in place and has high lithium ion conductivity are materials similar to those enumerated above in the explanation of the positive electrode. Of these polymers, polyvinylidene fluoride is most preferred. Polyvinylidene fluoride can hold the nonaqueous electrolyte in place and partially gels in the presence of the nonaqueous electrolyte. This further improves the ion conductivity of the negative electrode.

The adhesive polymer preferably takes a porous structure in the negative electrode. This adhesive polymer having a porous structure can hold the nonaqueous electrolyte in place and can increase the amount of nonaqueous electrolyte held in place in the negative electrode.

The total content of the adhesive polymer and the binder in the negative electrode is preferably 1 to 10 wt %.

As the collector, a porous conductive substrate or a conductive substrate having no pores can be used. These conductive substrates can be made from, e.g., copper, stainless steel, or nickel.

As this collector, it is particularly preferable to use a conductive substrate having a two-dimensional porous structure in which pores 3 mm or less in diameter exist at a ratio of one or more pores per 10 cm$^2$. That is, if the diameter of the pores formed in the conductive substrate is larger than 3 mm, no satisfactory negative electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm$^2$.

The conductive substrate having a two-dimensional porous structure in which pores 3 mm or less in diameter exist at a ratio of one or more pores per 10 cm$^2$ preferably has a thickness of 10 to 50 μm. If the thickness is less than 10 μm, no satisfactory negative electrode strength may be obtained. If the thickness exceeds 50 μm, the battery weight and the electrode group thickness increase. This may make it difficult to well increase the weight energy density and volume energy density of the thin secondary battery.

At least one end portion of the negative electrode preferably protrudes compared with the positive electrode. With this arrangement, current concentration to the end portions of the negative electrode can be reduced, and the cycle life and safety improved. More desirably, all end portions of the negative electrode protrude compared with the positive electrode.

As this negative electrode, it is possible to use a material containing a metal oxide, metal sulfide, or metal nitride, or a material containing lithium metal or a lithium alloy, in addition to the aforementioned material containing a carbonaceous material which absorbs and desorbs lithium ions.

Examples of the metal oxide are tin oxide, silicon oxide, lithium titanium oxide, niobium oxide, and tungsten oxide.

Examples of the metal sulfide are tin sulfide and titanium sulfide.

Examples of the metal nitride are lithium cobalt nitride, lithium iron nitride, and lithium manganese nitride.

Examples of the lithium alloy are lithium aluminum alloy, lithium tin alloy, lithium lead alloy, and lithium silicon alloy.

3) Separator

This separator is made from, e.g., a porous sheet holding at least an adhesive polymer in place.

As this porous sheet, for example, a porous film or a nonwoven fabric can be used. The porous sheet is preferably made from at least one type of material selected from, e.g., polyolefin and cellulose. Examples of polyolefin are polyethylene and polypropylene. Of these materials, a porous film made from one or both of polyethylene and polypropylene is preferred because the safety of the secondary battery can be improved.

The adhesive polymer desirably can keep being highly adhesive while holding the nonaqueous electrolyte in place. This polymer more preferably has high lithium ion conductivity. Examples of the polymer that is highly adhesive while holding the nonaqueous electrolyte in place and has high lithium ion conductivity are materials analogous to those enumerated above in the explanation of the positive electrode. Of these polymers, polyvinylidene fluoride is most preferred. Polyvinylidene fluoride can hold the nonaqueous electrolyte in place and partially gels in the presence of the nonaqueous electrolyte. This further improves the ion conductivity of the separator.

The adhesive polymer preferably takes a porous structure in the separator. This adhesive polymer having a porous structure can hold the nonaqueous electrolyte in place and can increase the amount of nonaqueous electrolyte held in place in the separator.

The content of the adhesive polymer in the separator is preferably 10 wt % or less. If the content exceeds 10 wt %, the ion conductivity of the nonaqueous electrolyte may decline, and this may make it impossible to well improve the large discharge characteristic and cycle life. The polymer content is more preferably 5 wt % or less and, most preferably, 1 wt % or less. The lower limit of this content is preferably $1\times10^{-5}$ wt %. If the content is less than $1\times10^{-5}$ wt %, it may become difficult to well increase the adhesion strength between the separator and the positive electrode and between the separator and the negative electrode. This may make it impossible to well improve the large discharge characteristic and cycle life. Therefore, the content preferably ranges between $1\times10^{-5}$ and 10 wt %. The lower limit is more preferably $1\times10^{-4}$ wt %, and most preferably, $1\times10^{-3}$ wt %.

In this separator, the concentration of the adhesive polymer can be either uniform or nonuniform. Desirably, the concentration of the adhesive polymer in the interior is lower than that of the adhesive polymer on the surface opposing the positive or negative electrode. It is particularly preferable that the concentration of the adhesive polymer in a central portion in the direction of thickness of the separator be lower than the concentration of the adhesive polymer on the surface opposing the positive or negative electrode.

The thickness of the porous sheet is preferably 30 μm or less. If the thickness exceeds 30 μm, the distance between the positive and negative electrodes increases, and this may increase the internal resistance. The lower limit of the thickness is preferably 5 μm. If the thickness is less than 5 μm, the separator strength may significantly lower to allow easy internal short circuit. The upper limit of the thickness is more preferably 25 μm, and its lower limit is more preferably 10 μm.

The heat shrinkage ratio of the porous sheet upon being left to stand at 120° C. for 1 hr is preferably 20% or less. If this heat shrinkage ratio exceeds 20%, it may become difficult to obtain satisfactory adhesion strength between the positive and negative electrodes and the separator. The heat shrinkage ratio is more preferably 15% or less.

The porous sheet preferably has a porosity of 30 to 60% for the reasons explained below. If the porosity is less than 30%, good electrolyte holding properties may become difficult to obtain in the separator. On the other hand, if the porosity exceeds 60%, no satisfactory separator strength may be obtained. A more favorable range of the porosity is 35 to 50%.

The air permeability of the porous sheet is preferably 600 sec/100 cm$^3$ or less. If the air permeability exceeds 600 sec/100 cm$^3$, high lithium ion mobility may become difficult to obtain in the separator. The lower limit of this air permeability is preferably 100 sec/100 cm$^3$. If the air permeability is less than 100 sec/100 cm$^3$, no satisfactory separator strength may be obtained. The upper limit of the air permeability is more preferably 500 sec/100 cm$^3$, and most preferably 400 sec/100 cm$^3$. The lower limit of the air permeability is more preferably 150 sec/100 cm$^3$.

At least one end portion of the separator preferably protrudes compared with the positive or negative electrode. With this arrangement, occurrence of internal short circuit can be suppressed when a shock is applied to the battery because, e.g., the battery is dropped by mistake or when the separator thermally shrinks because the battery is used in a high-temperature environment at 100° C. or more. More desirably, all end portions of the separator protrude compared with the positive or negative electrode. When at least one end portion of the positive electrode protrudes compared with the negative electrode or at least one end portion of the negative electrode protrudes compared with the positive electrode, the end portion of the separator desirably protrudes compared with this protruding end portion. It is particularly preferable that at least one end portion of the negative electrode protrude compared with the positive electrode and the end portion of the separator protrude compared with this protruding end portion.

When at least one end portion of the separator protrudes compared with the positive or negative electrode, the protrusion length is preferably 0.25 to 2 mm for the reasons explained below. If the protrusion length is shorter than 0.25 mm, the internal short circuit occurrence frequency may become difficult to reduce. On the other hand, if the protrusion length exceeds 2 mm, the volume energy density of the battery may decrease. A more favorable range is 0.5 to 1.5 mm. However, when at least one end portion of the positive electrode protrudes compared with the negative electrode or at least one end portion of the negative electrode protrudes compared with the positive electrode, the protrusion length is set on the basis of this protruding electrode end portion.

When at least one end portion of the separator protrudes compared with the positive or negative electrode, the adhesive polymer is preferably held in place in this protruding end portion. With this arrangement, the strength of the protruding separator end portion can be increased, so the internal short circuit occurrence frequency can be further reduced.

The types of adhesive polymers in the positive electrode, negative electrode, and separator are preferably the same. With this arrangement, the adhesion strength between the positive electrode and the separator and between the negative electrode and the separator can be well increased. Consequently, the large discharge characteristic and cycle characteristic can be further improved.

4) Nonaqueous Electrolyte

The nonaqueous electrolyte is a liquid electrolyte prepared by dissolving an electrolytic salt in a nonaqueous solvent.

As the nonaqueous solvent, known nonaqueous solvents used as lithium secondary battery solvents can be used with no particular limitations. However, it is preferable to use a nonaqueous solvent primarily consisting of a solvent mixture of propylene carbonate (PC) or ethylene carbonate (EC) and at least one nonaqueous solvent (to be referred to as a second solvent hereinafter) having a lower viscosity than that of the PC or EC and a donor number of not more than 18.

The second solvent is preferably chain carbon and, more preferably, dimethyl carbonate (DMC), methylethyl carbonate (MEC), diethyl carbonate (DEC), ethyl propionate, methyl propionate, γ-butyrolactone (γ-BL), acetonitrile (AN), ethyl acetate (EA), toluene, xylene, or methyl acetate (MA). These second solvents can be used singly or in the form of a mixture of two or more species thereof. The donor number of this second solvent is more preferably 16.5 or less.

The viscosity of the second solvent is preferably 28 mp or less at 25° C. The mixing ratio of the ethylene carbonate or propylene carbonate in the solvent mixture is preferably 10 to 80% and, more preferably, 20 to 75% as volume ratio.

More preferable compositions of the solvent mixture are a mixture of EC and MEC, mixture of EC, PC, and MEC, mixture of EC, MEC, and DEC, mixture of EC, MEC, and DMC, and mixture of EC, MEC, PC, and DEC. The volume ratio of MEC is preferably 30 to 80% and, more preferably, 40 to 70%.

Examples of the electrolytic salt contained in the nonaqueous electrolyte are lithium salts such as lithium perchlorate (LiClO$_4$), lithium hexafluoride (LiPF$_6$), lithium borofluoride (LiBF$_4$), lithium arsenic hexafluoride (LiAsF$_6$), lithium trifluoromethasulfonate (LiCF$_3$SO$_3$), and bistrifluoromethylsulfonylimide lithium [LiN(CF$_3$SO$_2$)$_2$]. Of these lithium salts, LiPF$_6$ and LiBF$_4$ are most preferred.

The dissolution amount of this electrolytic salt in the nonaqueous solvent is desirably 0.5 to 2.0 mol/l.

The amount of nonaqueous electrolyte is preferably 0.2 to 0.6 g per 100 mAh of battery unit capacity for the reasons explained below. If the nonaqueous electrolyte amount is less than 0.2 g/100 mAh, it may become impossible to well maintain the ion conductivity of the positive and negative electrodes. On the other hand, if the nonaqueous electrolyte amount exceeds 0.6 g/100 mAh, this large electrolyte amount may make sealing difficult when a film jacket is used. A more favorable range of the nonaqueous electrolyte amount is 0.4 to 0.55 g/100 mAh.

5) Jacket

As this jacket, a metal can or a film having a function of shielding water can be used. An example of the film is a laminate film including a metal layer and a flexible synthetic resin layer formed on at least a portion of the metal layer. Examples of the metal layer are aluminum, stainless steel, iron, copper, and nickel. Of these metals, aluminum that is light in weight is preferred. Examples of the synthetic resin are polyethylene and polypropylene.

The thickness of this film jacket is preferably 50 to 300 $\mu$m for the reasons explained below. If the thickness is smaller than 50 $\mu$m, the jacket readily deforms or breaks. If the thickness is larger than 300 $\mu$m, no high weight energy density may be obtained. A more desirable range of the thickness is 80 to 150 $\mu$m.

When this film jacket is used, the electrode group is desirably adhered to the inner surface of the jacket by an adhesive layer formed on at least a portion of the surface of the electrode group. With this arrangement, the jacket can be fixed to the surface of the electrode group. So, it is possible to prevent the nonaqueous electrolyte from permeating boundary between the electrode group and the jacket.

The adhesive layer preferably contains an adhesive polymer. This adhesive polymer desirably can keep being highly adhesive while holding the nonaqueous electrolyte in place. This polymer more preferably has high lithium ion conductivity. Examples of the polymer that is highly adhesive while holding the nonaqueous electrolyte in place and has high lithium ion conductivity are materials similar to those enumerated above in the explanation of the positive electrode. Of these polymers, polyvinylidene fluoride is most preferred.

The adhesive layer preferably takes a porous structure. This adhesive layer having a porous structure can increase the nonaqueous electrolyte holding amount.

The total amount of adhesive polymers contained in the battery is preferably 0.2 to 6 mg per 100 mAh battery capacity for the reasons explained below. If the total amount of adhesive polymers is less than 0.2 mg per 100 mAh battery capacity, it may become difficult to well increase the adhesion strength between the positive electrode and the separator and between the negative electrode and the separator. On the other hand, if the total amount exceeds 6 mg per 100 mAh battery capacity, the lithium ion conductivity of the secondary battery may decrease, or its internal resistance may increase. This may make it difficult to well improve the discharge capacity, large discharge characteristic, and charge/discharge cycle life. A more preferable range of the total amount of adhesive polymers is 0.5 to 3 mg per 100 mAh battery capacity.

When the total amount of adhesive polymers contained in the battery is 0.2 to 6 mg per 100 mAh battery capacity, the amount of nonaqueous electrolyte is preferably 0.2 to 0.6 g per 100 mAh of battery unit capacity.

A thin lithium ion secondary battery as an example of the first and second nonaqueous electrolyte secondary battery according to the present invention will be described below with reference to FIGS. 1 to 4.

Figure 2:
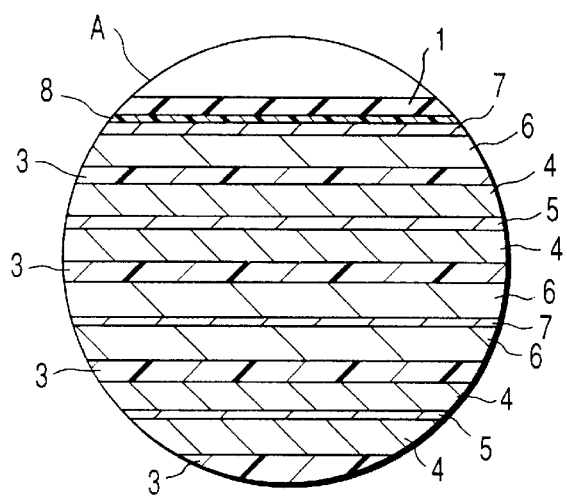
FIG. 2 is an enlarged sectional view showing a portion A in FIG. 1.
Figure 3:
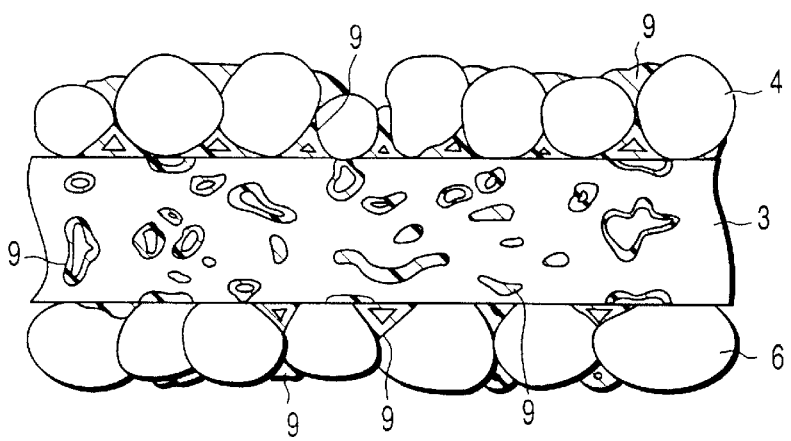
FIG. 3 is a schematic view showing the boundaries and their vicinities between a positive electrode, separator, and negative electrode in the secondary battery shown in FIG. 1.

FIG. 1 is a sectional view showing this example of the first and second nonaqueous electrolyte secondary battery according to the present invention. FIG. 2 is an enlarged sectional view showing a portion A in FIG. 1. FIG. 3 is a schematic view showing the boundaries and their vicinities of a positive electrode, separator, and negative electrode in the secondary battery shown in FIG. 1.

As shown in FIG. 1, a jacket 1 made of a laminate film or the like surrounds an electrode group 2. This electrode group 2 has a structure formed by spirally winding a stack including a positive electrode, negative electrode, and separator, and compression-molding the coil in the direction of diameter. As shown in FIG. 2, the stack is formed by stacking a separator 3, a positive electrode layer 4, a positive electrode collector 5, a positive electrode layer 4, a separator 3, a negative electrode layer 6, a negative electrode collector 7, a negative electrode layer 6, a separator 3, a positive electrode layer 4, a positive electrode collector 5, a positive electrode layer 4, a separator 3, a negative electrode layer 6, and a negative electrode collector 7 in this order. The negative electrode collector 7 is the outermost layer of the electrode group 2. An adhesive layer 8 is present on the surface of the electrode group 2. The adhesive layer 8 is adhered to the inner surface of the jacket 1. As shown in FIG. 3, in voids of the positive electrode layer 4, the separator 3, and the negative electrode layer 6, an adhesive polymer 9 is held, respectively. The positive electrode and the separator 3 are adhered to each other by adhesive polymers 9 that are dispersedly present in the positive electrode layer 4 and the separator 3 and in a boundary between the positive electrode layer 4 and the separator 3. The negative electrode and the separator 3 are adhered to each other by adhesive polymers 9 that are dispersedly present in the negative electrode layer 6 and the separator 3 and in a boundary between the negative electrode layer 6 and the separator 3. The electrode group 2 in the jacket 1 is impregnated with a nonaqueous electrolyte. A band-like positive electrode lead 10 has one end connected to the positive electrode collector 5 of the electrode group 2 and the other end extending from the jacket 1. A band-like negative electrode lead 11 has one end connected to the negative electrode collector 7 of the electrode group 2 and the other end extending from the jacket 1.

Figure 4:
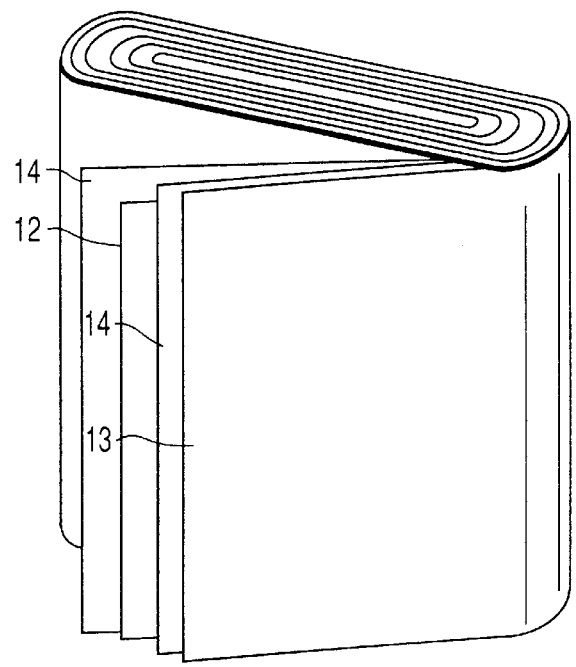
FIG. 4 is a perspective view showing another electrode group incorporated into the first and second nonaqueous electrolyte secondary battery according to the present invention.

The electrode group shown in FIG. 1 has a structure obtained by spirally winding a stack including a plurality of positive electrodes and a plurality of negative electrodes and compressing the coil in the direction of diameter. However, as shown in FIG. 4, it is also possible to use an electrode group having a structure formed by spirally winding one positive electrode 12 and one negative electrode 13 with a separator 14 interposed between them and compressing the coil in the direction of diameter.

Figure 5:
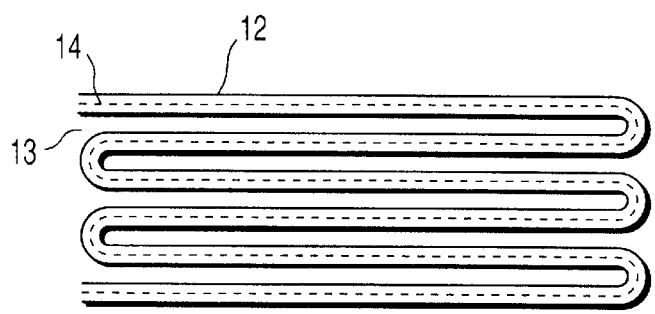
FIG. 5 is a side view showing still another electrode group incorporated into the first and second nonaqueous electrolyte secondary battery according to the present invention.

Also, the electrode group shown in FIG. 1 has a structure obtained by spirally winding positive and negative electrodes with separators interposed between them and compressing the coil in the direction of diameter. However, an electrode group having a structure formed by folding positive and negative electrodes with a separator interposed between them may be used. One example is shown in FIG. 5. As FIG. 5 shows, this electrode group has a structure formed by folding a positive electrode 12 and a negative electrode 13 a plurality of times (e.g., 5 times) with a separator 14 interposed between them such that the opposing surfaces of the negative electrode 13 contact each other.

In FIG. 1, the adhesive layer 8 is formed on the entire surface of the electrode group 2. However, this adhesive layer 8 can also be formed only on a portion of the surface of the electrode group 2 provided that a permeation of the nonaqueous electrolyte between the electrode group 2 and the jacket 1 can be suppressed. The adhesive layer is preferably formed at least on the outermost surface. In the case of an electrode group having a folded structure as described above, the adhesive layer is desirably formed at least on the side surfaces.

The first and second nonaqueous electrolyte secondary battery are manufactured by, e.g., the following method.

(First Step)

A separator not containing an adhesive polymer is interposed between positive and negative electrodes to form an electrode group.

This electrode group is desirably formed by any of: spirally winding positive and negative electrodes with a separator not containing an adhesive polymer interposed between them; spirally winding a positive and negative electrodes with a separator not containing an adhesive polymer interposed between them and compressing the spiral or coil in the direction of diameter; and folding positive and negative electrodes a plurality of times with a separator not containing an adhesive polymer interposed between them. When the electrode group is formed by any of these methods, in a second step (to be described later) it is possible to allow a solution of an adhesive polymer to permeate the positive electrode, negative electrode, and separator and at the same time prevent this solution from permeating the whole boundary between the positive electrode and the separator and the whole boundary between the negative electrode and the separator. Consequently, the adhesive polymer can be dispersedly present in the positive electrode, negative electrode, and separator and can be dispersedly present in a boundary between the positive electrode and the separator and in a boundary between the negative electrode and the separator.

The positive electrode is formed by suspending an active positive electrode material, conducting agent, and binder in an appropriate solvent, coating a collector with this suspension, and drying the collector to form a thin plate. Examples of the active positive electrode material, conducting agent, binder, and collector are materials similar to those enumerated above in the explanation of 1) Positive electrode.

The negative electrode is formed by kneading a carbonaceous material which absorbs and desorbs lithium ions and binder in the presence of a solvent, coating a collector with the resultant suspension, drying the collector, and pressing the collector once or 2 to 5 times with desired pressure. Examples of the carbonaceous material, binder, and collector are materials similar to those enumerated above in the explanation of 2) Negative electrode.

The separator not containing an adhesive polymer is made of, e.g., a porous sheet. Examples of the porous sheet is material similar to those enumerated above in the explanation of 3) separator.

(Second Step)

The electrode group is housed in a bag-like film jacket. In this case it is desirable that the stacked section of this electrode group be seen through the opening of the jacket. A solution prepared by dissolving an adhesive polymer in a solvent is injected into the electrode group in the jacket to impregnate the electrode group with the solution.

Examples of the film jacket are materials analogous to those enumerated above in the explanation of 5) Jacket.

The adhesive polymer desirably can keep being highly adhesive while holding the nonaqueous electrolyte in place. This polymer more preferably has high lithium ion conductivity. Examples of the polymer that is highly adhesive while holding the nonaqueous electrolyte in place and has high lithium ion conductivity are materials analogous to those enumerated above in the explanation of 1) positive electrode. Of these polymers, polyvinylidene fluoride is most preferred.

The solvent is desirably an organic solvent having a boiling point of 200° C. or less. Dimethylformamide (boiling point 153° C.) is an example of this organic solvent. If the boiling point of the organic solvent exceeds 200° C., a long drying time may be necessary when the temperature of drying (to be described later) is set at 100° C. or less. The lower limit of the organic solvent boiling point is preferably 50° C. If the organic solvent boiling point is lower than 50° C., the organic solvent may evaporate while the solution is injected into the electrode group. The upper limit of the boiling point is more preferably 180° C., and its lower limit is more preferably 100° C.

The concentration of the adhesive polymer in the solution is preferably 0.1 to 2.5 wt % for the following reasons. If the concentration is less than 0.1 wt %, it may become difficult to adhere the positive electrode and the separator, and the negative electrode and the separator, with sufficient strength. On the other hand, if the concentration exceeds 2.5 wt %, it may become difficult to obtain enough porosity to hold the nonaqueous electrolyte in place, and the interface impedance of the electrode may increase. If the interface impedance increases, the capacity and the large discharge characteristic greatly degrade. A more favorable range of the concentration is 0.5 to 1.5 wt %.

When the concentration of the adhesive polymer in the solution is 0.1 to 2.5 wt %, the injection amount of solution is preferably 0.2 to 2 ml per 100 mAh battery capacity for the following reasons. If the injection amount is less than 0.2 ml, it may become difficult to well improve the adhesion strength between the positive electrode and the separator and between the negative electrode and the separator. On the other hand, if the injection amount exceeds 2 ml, the lithium ion conductivity of the secondary battery may decrease, or its internal resistance may increase. This may make it difficult to improve the discharge capacity, large discharge characteristic, and charge/discharge cycle life. A more favorable range of the injection amount is 0.3 to 1 ml per 100 mAh battery capacity.

(Third Step)

The electrode group is dried at normal pressure or reduced pressure including vacuum to evaporate the solvent in the solution while press molding into a predetermined thickness. By this step, adhesive polymers are held in voids of the positive electrode, the negative electrode, and the separator, and the positive electrode, the negative electrode, and the separator are adhered to each other. In addition, a portion of the adhesive polymer is dispersedly present in a boundary between the positive electrode and the separator-and in a boundary between the negative electrode and the separator. By this step, water removal contained in the electrode group can be simultaneously preformed.

The molding can be performed by forcing into a mold in place of press molding described above.

The electrode group can contain a slight amount of solvent.

The electrode group can be dried by, e.g., heating at normal pressure or reduced pressure or in a vacuum. Of these methods, reduced pressure heating or vacuum heating is preferred.

The drying is preferably performed at 100° C. or less for the following reasons. If the drying temperature exceeds 100° C., the separator may greatly thermally shrink. If this large thermal shrinkage occurs, the separator warps, and this makes it difficult to strongly adhere the positive electrode, negative electrode, and separator. This thermal shrinkage readily occurs when a porous film containing polyethylene or polypropylene is used as a separator. The lower the drying temperature, the more easily this separator thermal shrinkage can be suppressed. However, if the drying temperature is lower than 40° C., the solvent may become difficult to well evaporate. Therefore, the drying temperature is more preferably 40 to 100° C. and, most preferably, 60 to 90° C.

(Fourth Step)

After a nonaqueous electrolyte is injected into the electrode group in the jacket, the opening of the jacket is sealed to complete the thin nonaqueous electrolyte secondary battery.

As the nonaqueous electrolyte, materials similar to those enumerated above in the explanation of the aforementioned first nonaqueous electrolyte secondary battery can be used.

In the above manufacturing method, after the electrode group is housed in the jacket the solution of the adhesive polymer is injected. However, this solution can also be injected before the electrode group is housed in the jacket. If this is the case, the electrode group is formed by interposing the separator between the positive and negative electrodes. This electrode group is impregnated with the solution and molded while being dried to evaporate the solvent in the solution. After this electrode group is housed in the jacket, the nonaqueous electrolyte is injected, and the opening of the jacket is sealed to manufacture the thin nonaqueous electrolyte secondary battery.

In the above-mentioned manufacturing method, drying and molding were simultaneously performed, but dying may be performed at any time, for example, before molding or after molding.

Note that the concentration of the adhesive polymer in the interior of the separator can be made lower than that of the adhesive polymer on the surface opposing the positive or negative electrode. This is done by, e.g., using a separator having surface porosity higher than internal porosity or increasing the gap in the boundary between the positive electrode and the separator and in the boundary between the negative electrode and the separator.

The third nonaqueous electrolyte secondary battery according to the present invention comprises an electrode group having a structure formed by spirally winding positive and negative electrodes with a separator interposed between them and compressing the coil in the direction of diameter, a nonaqueous electrolyte with which the electrode group is impregnated, and a film jacket in which the electrode is housed. A surface of the electrode group to which a stacked structure is exposed has a shape meeting:

$$0.9 \leq L_2/L_1 \leq 1.2 \quad \text{(I)}$$

wherein $L_2$ is a thickness of a most multilayered portion in a region of the surface except curved-layer-regions and $L_1$ is a thickness of an end portion which is one of end portions of the region except the curved-layer-regions and is equal in number of layers to that of $L_2$.

An example of the third nonaqueous electrolyte secondary battery according to the present invention will be described below with reference to FIGS. 6 and 7.

Figure 6:
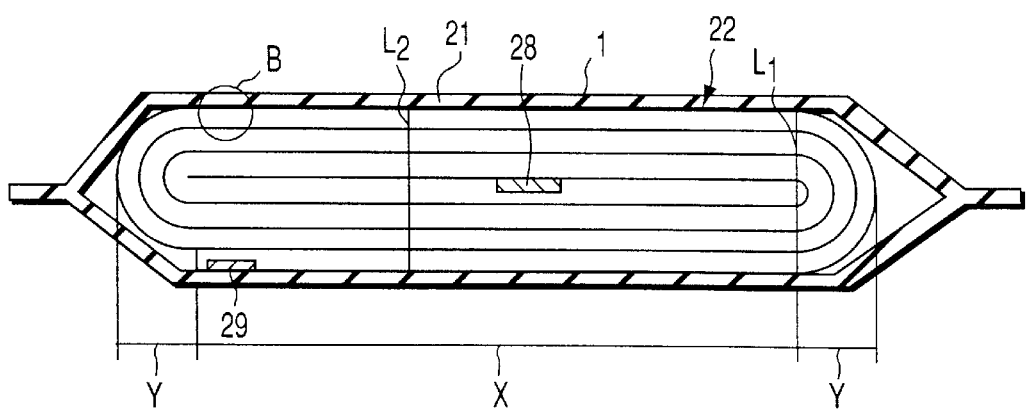
FIG. 6 is a sectional view showing an example of the third nonaqueous electrolyte secondary battery according to the present invention.
Figure 7:
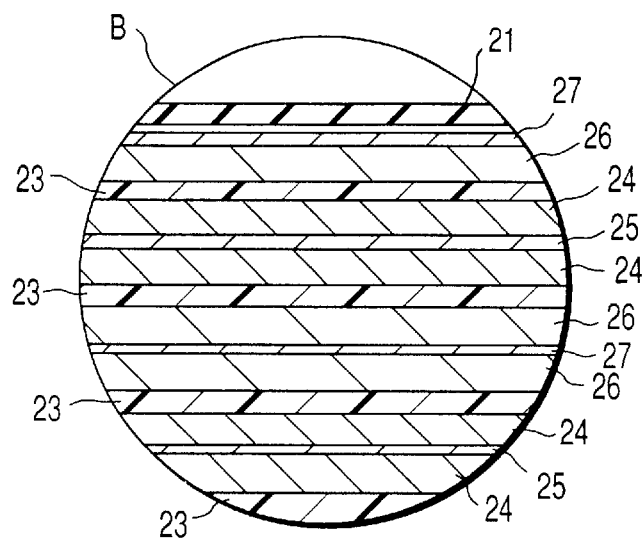
FIG. 7 is an enlarged sectional view showing a portion B in FIG. 6.

FIG. 6 is a sectional view showing this example of the third nonaqueous electrolyte secondary battery according to the present invention. FIG. 7 is an enlarged sectional view showing a portion B in FIG. 6.

A film jacket 21 surrounds an electrode group 22. This electrode group 22 has a structure formed by spirally winding a stack including a positive electrode, negative electrode, and separator, and compression-molding the coil in the direction of diameter. As shown in FIG. 7, the stack is formed by stacking a separator 23, a positive electrode layer 24, a positive electrode collector 25, a positive electrode layer 24, a separator 23, a negative electrode layer 26, a negative electrode collector 27, a negative electrode layer 26, a separator 23, a positive electrode layer 24, a positive electrode collector 25, a positive electrode layer 24, a separator 23, a negative electrode layer 26, and a negative electrode collector 27 in this order. The negative electrode collector 27 is the outermost layer of the electrode group 22. The electrode group 22 in the jacket 21 is impregnated with a nonaqueous electrolyte. A band-like positive electrode lead 28 has one end connected to the positive electrode collector 25 of the electrode group 22 and the other end extending from the jacket 21. A band-like negative electrode lead 29 has one end connected to the negative electrode collector 27 of the electrode group 22 and the other end extending from the jacket 21.

A surface (perpendicular to the axis of winding) of the electrode group 22 to which the stacked structure is exposed has a shape meeting:

$$0.9 \leq L_2/L_1 \leq 1.2 \quad \text{(I)}$$

where $L_2$ is the thickness of a most multilayered portion of a region X in the surface, where layers are stacked so as to be substantially in parallel to each other, and $L_1$ is the thickness of an end portion which is one of end portions of the region X and is equal in number of layers to that of $L_2$. The region Y is constructed of curved layers. The number of layers means the total number of stacked positive electrodes, negative electrodes, and separators.

In this secondary battery according to the present invention, the surface of the electrode group to which the stacked structure is exposed satisfies relation (I) above at least after assembly or after charge or after discharge. It is particularly desirable that the surface of the electrode group to which the stacked structure is exposed satisfy relation (I) at least after charge.

The range of the ratio $L_2/L_1$ is defined as above for the reasons explained below. Unlike a jacket made of a metal can, the film jacket has almost no effect of clamping or pressing the electrode group. Therefore, if the ratio $L_2/L_1$ exceeds 1.2, the contact between the positive electrode and the separator or between the negative electrode and the separator in the electrode group becomes unsatisfactory. Additionally, the contact area further reduces with the progress of charge/discharge cycle. As a consequence, lithium easily precipitates in the negative electrode, so no long life can be obtained. On the other hand, if the ratio $L_2/L_1$ is less than 0.9, the porosity of the electrode group decreases. Since this reduces the amount of nonaqueous electrolyte held in place by the electrode group, the charge/discharge cycle life becomes difficult to improve. A more favorable range of the ratio $L_2/L_1$ is 0.95 to 1.1.

As the nonaqueous electrolyte and film jacket, materials similar to those enumerated above in the explanation of the first and second nonaqueous electrolyte secondary battery can be used. The positive electrode, negative electrode, and separator will be described below.

(1) Positive Electrode

This positive electrode has a collector and a positive electrode layer containing an active material and a binder and carried by one or both surfaces of the collector.

Examples of the active positive electrode material are materials analogous to those enumerated above in the explanation of the positive electrode of the first and second nonaqueous electrolyte secondary battery.

The binder has functions of allowing the collector to hold the active material in place and binding particles of the active material to each other. As this binder, it is possible to use one or more types of polymers selected from polytetrafluoroethylene (PTFE), ethylene-propylene-diene copolymer (EPDM), styrene-butadiene rubber (SBR), and polyvinylidene fluoride (PVdF).

The content of the binder in the positive electrode is desirably 2 to 7 wt %.

The positive electrode layer preferably further contains a conducting agent. Examples of this conducting agent are materials similar to those enumerated above in the explanation of the positive electrode of the first and second nonaqueous electrolyte secondary battery. The content of this conducting agent in the positive electrode is preferably 3 to 20 wt % when the content of the active positive electrode material is 80 to 95 wt %.

As the collector, a porous conductive substrate or a conductive substrate having no pores can be used. These conductive substrates can be made from, e.g., aluminum, stainless steel, or nickel.

As this collector, it is particularly preferable to use a conductive substrate having a two-dimensional porous structure in which pores 3 mm or less in diameter exist at a ratio of one or more pores per 10 cm$^2$. That is, if the diameter of the pores formed in the conductive substrate is larger than 3 mm, no satisfactory positive electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm$^2$.

The conductive substrate having a two-dimensional porous structure in which pores 3 mm or less in diameter exist at a ratio of one or more pores per 10 cm$^2$ preferably has a thickness of 15 to 100 $\mu$m. If the thickness is less than 15 $\mu$m, no satisfactory positive electrode strength may be obtained. If the thickness exceeds 100 $\mu$m, the battery weight and the electrode group thickness increase. This may make it difficult to well increase the weight energy density and volume energy density of the thin secondary battery. A more favorable range of the thickness is 30 to 80 $\mu$m.

The positive electrode is manufactured by, e.g., suspending the positive electrode active material, conducting agent, and binder in an appropriate solvent, coating the collector with this suspension, and drying the coated collector to form a thin plate.

(2) Negative Electrode

The negative electrode has a collector and a negative electrode layer containing an active material and a binder and carried by one or both surfaces of the collector.

Examples of the active material are materials analogous to those enumerated above in the explanation of the negative electrode of the first and second nonaqueous electrolyte secondary battery.

The binder has functions of allowing the collector to hold the active material in place and binding particles of the active material to each other. As this binder, it is possible to use one or more types of polymers selected from polytetrafluoroethylene (PTFE), ethylene-propylene-diene copolymer (EPDM), styrene-butadiene rubber (SBR), carboxymethylcellulose (CMC), and polyvinylidene fluoride (PVdF). When the carbonaceous material described above is used as the active material, the content of the binder in the negative electrode is desirably 2 to 10 wt %.

As the collector, a porous conductive substrate or a conductive substrate having no pores can be used. These conductive substrates can be made from, e.g., copper, stainless steel, or nickel.

As this collector, it is particularly preferable to use a conductive substrate having a two-dimensional porous structure in which pores 3 mm or less in diameter exist at a ratio of one or more pores per 10 cm$^2$. That is, if the diameter of the pores formed in the conductive substrate is larger than 3 mm, no satisfactory negative electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm$^2$.

The conductive substrate having a two-dimensional porous structure in which pores 3 mm or less in diameter exist at a ratio of one or more pores per 10 cm$^2$ preferably has a thickness of 10 to 50 $\mu$m. If the thickness is less than 10 $\mu$m, no satisfactory negative electrode strength may be obtained. If the thickness exceeds 50 $\mu$m, the battery weight and the electrode group thickness increase. This may make it difficult to well increase the weight energy density and volume energy density of the thin secondary battery.

At least one end portion of the negative electrode preferably protrudes compared with the positive electrode. With this arrangement, current concentration to the end portions of the negative electrode can be reduced, and the cycle life and safety improved. More desirably, all end portions of the negative electrode protrude compared with the positive electrode.

The negative electrode can be manufactured by, e.g., kneading the carbonaceous material that absorbs and desorbs lithium ions and the binder in the presence of a solvent, coating the collector with the resultant suspension, drying the collector, and pressing the collector once or 2 to 5 times with desired pressure.

As this negative electrode, it is possible to use a material containing a metal oxide, metal sulfide, or metal nitride, or a material containing lithium metal or a lithium alloy, in addition to the aforementioned material containing the carbonaceous material that absorbs and desorbs lithium ions.

Examples of the metal oxide, metal sulfide, metal nitride, and lithium alloy are materials analogous to those enumerated above in the explanation of the negative electrode of the first and second nonaqueous electrolyte secondary battery.

(3) Separator

As the separator, a porous sheet, for example, can be used. As the porous sheet, for example, a porous film or a nonwoven fabric can be used. The porous sheet is preferably made from at least one type of material selected from, e.g., polyolefin and cellulose. Examples of polyolefin are polyethylene and polypropylene. Of these materials, a porous film made from one or both of polyethylene and polypropylene is preferable because the safety of the secondary battery can be improved.

The thickness of the porous sheet is preferably 30 µm or less. If the thickness exceeds 30 µm, the distance between the positive and negative electrodes increases, and this may increase the internal resistance. The lower limit of the thickness is preferably 5 µm. If the thickness is less than 5 µm, the separator strength may significantly lower to allow easy internal short circuit. The upper limit of the thickness is more preferably 25 µm, and its lower limit is more preferably 10 µm.

The heat shrinkage ratio of the porous sheet upon being left to stand at 120° C. for 1 hr is preferably 20% or less. If this heat shrinkage ratio exceeds 20%, it may become difficult to obtain satisfactory contact between the positive and negative electrodes and the separator. The heat shrinkage ratio is more preferably 15% or less.

The porous sheet preferably has a porosity of 30 to 60% for the reasons explained below. If the porosity is less than 30%, good electrolyte holding properties may become difficult to obtain in the separator. On the other hand, if the porosity exceeds 60%, no satisfactory separator strength may be obtained. A more favorable range of the porosity is 35 to 50%.

The air permeability of the porous sheet is preferably 600 sec/100 cm³ or less. If the air permeability exceeds 600 sec/100 cm³, high lithium ion mobility may become difficult to obtain in the separator. The lower limit of this air permeability is preferably 100 sec/100 cm³. If the air permeability is less than 100 sec/100 cm³, no satisfactory separator strength may be obtained. The upper limit of the air permeability is more preferably 500 sec/100 cm³, and most preferably 400 sec/100 cm³. The lower limit of the air permeability is more preferably 150 sec/100 cm³.

The separator can contain a slight amount of adhesive polymers. The content of the adhesive polymer in an electrode group including this separator is preferably 0.1 wt % or less (including 0 wt %). If the content exceeds 0.1 wt %, the lithium ion conductivity of the separator may be decline.

At least one end portion of the separator preferably protrudes compared with the positive or negative electrode. With this arrangement, occurrence of internal short circuit can be suppressed when a shock is applied to the battery because, e.g., the battery is dropped by mistake or when the separator thermally shrinks because the battery is used in a high-temperature environment at 100° C. or more. More desirably, all end portions of the separator protrude compared with the positive or negative electrode. When at least one end portion of the positive electrode protrudes compared with the negative electrode or at least one end portion of the negative electrode protrudes compared with the positive electrode, the end portion of the separator desirably protrudes compared with this protruding end portion. It is particularly preferable that at least one end portion of the negative electrode protrude compared with the positive electrode and the end portion of the separator protrude compared with this protruding end portion.

When at least one end portion of the separator protrudes compared with the positive or negative electrode, the protrusion length is preferably 0.25 to 2 mm for the reasons explained below. If the protrusion length is shorter than 0.25 mm, the internal short circuit occurrence frequency may become difficult to reduce. On the other hand, if the protrusion length exceeds 2 mm, the volume energy density of the battery may decrease. A more favorable range is 0.5 to 1.5 mm. However, when at least one end portion of the positive electrode protrudes compared with the negative electrode or at least one end portion of the negative electrode protrudes compared with the positive electrode, the protrusion length is set on the basis of this protruding electrode end portion.

Referring FIG. 6, the winding end portion of the electrode group 22 is formed in the end portion of the region X. However, this winding end portion of the electrode group 22 can be formed in any position. For example, the winding end portion can be formed near the center of the region X or in either curved-layer-region Y.

Also, the electrode group shown in FIG. 6 is formed by using a plurality of positive electrodes and a plurality of negative electrodes. However, the present invention is also applicable to an electrode group having a structure obtained by spirally winding one positive electrode and one negative electrode with a separator interposed between them and compressing the coil in the direction of diameter.

The fourth nonaqueous electrolyte secondary battery according to the present invention comprises an electrode group having a structure formed by folding positive and negative electrodes twice or more with a separator interposed between them, a nonaqueous electrolyte with which the electrode group is impregnated, and a film jacket in which the electrode group is housed. A surface of the electrode group to which a stacked structure is exposed has a shape meeting:

$$0.9 \leq L_4/L_3 \leq 1.2 \tag{II}$$

wherein $L_4$ is a thickness of a most multilayered portion in a region of the surface except folded-layer-regions and $L_3$ is a thickness of an end portion which is one of end portions of the region except the folded-layer-regions and is equal in number of layers to that of $L_4$.

An example of the fourth nonaqueous electrolyte secondary battery according to the present invention will be described below with reference to FIGS. 8 and 9.

Figure 8:
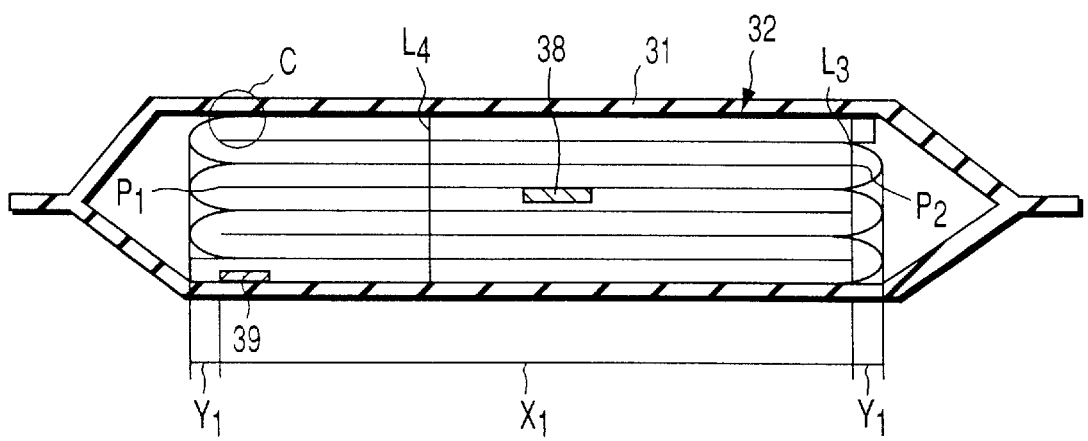
FIG. 8 is a sectional view showing an example of the fourth nonaqueous electrolyte secondary battery according to the present invention.
Figure 9:
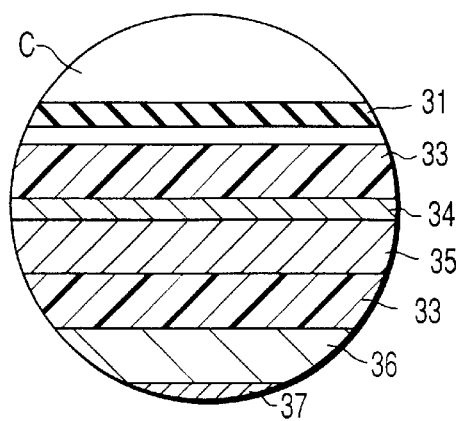
FIG. 9 is an enlarged sectional view showing a portion C in FIG. 8.

FIG. 8 is a sectional view showing this example of the fourth nonaqueous electrolyte secondary battery according to the present invention. FIG. 9 is an enlarged sectional view showing a portion C in FIG. 8.

A film jacket 31 surrounds an electrode group 32. This electrode group 32 is formed by folding a stack, in which, as shown in FIG. 9, a strip-shaped separator 33, a strip-shaped positive electrode collector 34, a strip-shaped positive electrode layer 35, a strip-shaped separator 33, a strip-shaped negative electrode layer 36, and a strip-shaped negative electrode collector 37 are stacked in this order, six times such that the opposing surfaces of the negative electrode collector 37 contact each other. The electrode group 32 in the jacket 31 is impregnated with a nonaqueous electrolyte. A band-like positive electrode lead 38 has one end connected to the positive electrode collector 34 of the electrode group 22 and the other end extending from the jacket 31. A band-like negative electrode lead 39 has one end connected to the negative electrode collector 37 of the electrode group 22 and the other end extending from the jacket 31.

A surface of the electrode group 32 to which the stacked structure is exposed has a shape meeting:

$$0.9 \leq L_4/L_3 \leq 1.2 \tag{II}$$

where $L_4$ is the thickness of a most multilayered portion of a region $X_1$ in the surface, which is situated between an arbitrary turning point $P_1$ and a subsequent turning point $P_2$, and $L_3$ is a thickness which is one of thicknesses passing the turning points $P_1$ and $P_2$, and is equal in number of layers to that of $L_4$. The turning point is a point at which the folded portions of the stack constructed of the positive electrode, negative electrode, and separator start overlapping each other when the stack is folded. The turning points $P_1$ and $P_2$ should be selected such that the folded-layer-regions $Y_1$ are not included in the region $X_1$. The number of layers means the total number of stacked positive electrodes, negative electrodes, and separators.

In this secondary battery according to the present invention, the stacked section of the electrode group satisfies relation (II) above at least after assembly or after charge or after discharge. It is particularly desirable that the stacked section of the electrode group satisfy relation (II) at least after charge.

The range of the ratio $L_4/L_3$ is defined as above for the reasons explained below. Unlike a jacket made of a metal can, the film jacket has almost no effect of clamping or pressing the electrode group. Therefore, if the ratio $L_4/L_3$ exceeds 1.2, the contact between the positive electrode and the separator or between the negative electrode and the separator in the electrode group becomes unsatisfactory. Additionally, the contact area further reduces with the progress of charge/discharge cycle. As a consequence, lithium easily precipitates in the negative electrode, so no long life can be obtained. On the other hand, if the ratio $L_4/L_3$ is less than 0.9, the porosity of the electrode group decreases. Since this reduces the amount of nonaqueous electrolyte held in place by the electrode group, the charge/discharge cycle life becomes difficult to improve. A more favorable range of the ratio $L_4/L_3$ is 0.95 to 1.1.

As the positive electrode, negative electrode, separator, nonaqueous electrolyte, and film jacket, materials similar to those enumerated above in the explanation of the third nonaqueous electrolyte secondary battery can be used.

Referring to FIG. 8, the two end portions of the strip-shaped stack constructed of the positive electrode, negative electrode, and separator overlap the folded portions of the electrode group. However, the positions of these two end portions of the strip-shaped stack are not particularly limited. As an example, the two end portions of the strip-shaped stack can overlap the region $X_1$. Alternatively, the two end portions of the strip-shaped stack can be in different positions.

The electrode group shown in FIG. 8 is formed by folding one positive electrode and one negative electrode a plurality of times with a separator interposed between them such that the opposing surfaces of the negative electrode contact each other. However, an electrode group can also be formed by stacking a separator, positive electrode, separator, and negative electrode in this order and folding the stack a plurality of times such that the opposing surfaces of the separator contact each other.

The third and fourth nonaqueous electrolyte secondary batteries are manufactured by, e.g., the following method.

(First Step)

An electrode group is formed by any of methods (a) to (c) below.

(a) Positive and negative electrodes are spirally wound with a separator interposed between them.

(b) Positive and negative electrodes are spirally wound with a separator interposed between them, and the coil is compressed in the direction of diameter.

(c) Positive and negative electrodes are folded twice or more with a separator interposed between them.

As the positive electrode, negative electrode, separator, and nonaqueous electrolyte, materials similar to those enumerated above in the explanation of the third nonaqueous electrolyte secondary battery can be used.

(Second Step)

The electrode group is housed in a bag-like film jacket.

As the film jacket, materials similar to those enumerated above in the explanation of the third nonaqueous electrolyte secondary battery can be used.

(Third Step)

The electrode group is molded while being heated to 40 to 120° C.

This molding is desirably performed such that the electrode group is compressed in the direction of diameter if it is formed by method (a), and is compressed in the direction of stacking if it is formed by method (b) or (c).

The molding can be performed by press molding or forcing into a mold.

The electrode group is heated when it is molded for the reasons explained below. In the electrode group, the positive and negative electrodes are substantially in direct contact with the separator, and the separator contains scarcely adhesive polymer. If this electrode group is molded at room temperature, spring back occurs after the molding, i.e., gaps are formed between the positive electrode and the separator and between the negative electrode and the separator. Consequently, the ratio $L_2/L_1$ and the ratio $L_4/L_3$ become larger than 1.2. When the electrode group is molded at 40° C. or higher, the binders contained in the positive and negative electrodes can be thermally set, so the hardness of the electrode group can be increased. Since this suppresses the spring back after the molding, the ratio $L_2/L_1$ and the ratio $L_4/L_3$ can be decreased to 1.2 or less. On the other hand, if the temperature of the electrode group exceeds 120° C., the separator may greatly thermally shrink. The temperature is more preferably 60 to 100° C.

The molding by heating to a specific temperature described above can be performed at normal pressure or reduced pressure or in a vacuum. This heat molding is desirably performed at reduced pressure or in a vacuum because the efficiency of water removal from the electrode group improves.

When the molding is performed by press molding, the pressure is preferably set to between 0.01 and 20 kg/cm² for the following reasons. If the pressure is lower than 0.01 kg/cm², the ratio $L_2/L_1$ and the ratio $L_4/L_3$ become larger than 1.2. If the pressure is higher than 20 kg/cm², the ratio $L_2/L_1$ and the ratio $L_4/L_3$ become smaller than 0.9.

(Fourth Step)

After a nonaqueous electrolyte is injected into the electrode group in the jacket, the opening of the jacket is sealed to complete the third or fourth nonaqueous electrolyte secondary battery.

In the above manufacturing method, after being housed in the jacket the electrode group is molded while being heated to a specific temperature. However, this heat molding can also be performed before the electrode group is housed in the jacket. If this is the case, an electrode group is formed in the first step described earlier and molded while being heated to 40 to 120° C. Then, this electrode group is housed in the film jacket. After that, the nonaqueous electrolyte is injected, and the opening of the jacket is sealed to complete the third or fourth nonaqueous electrolyte secondary battery.

A nonaqueous electrolyte secondary battery can also be assembled by manufacturing an electrode group by stacking positive and negative electrodes with a separator interposed between them, molding this electrode group in the direction of stacking under heating, and housing the resultant electrode group and a nonaqueous electrolyte in a jacket. In this method, the positive electrode, negative electrode, and separator can be well kept in contact with each other for long time periods. Therefore, a nonaqueous electrolyte secondary battery having an improved large discharge characteristic and cycle characteristic can be realized. In a method like this, excellent characteristics can be obtained even when the electrode group heating temperature is 40° C. or less.

The fifth nonaqueous electrolyte secondary battery according to the present invention comprises an electrode group having a structure formed by spirally winding a positive electrode and a negative electrode with a separator interposed between them and compressing the resultant coil in the direction of diameter, a nonaqueous electrolyte with which the electrode group is impregnated, and a film jacket in which the electrode group is housed. The positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator. A surface of the electrode group to which a stacked structure is exposed has a shape meeting relation (I) described above.

As the positive electrode, negative electrode, separator, nonaqueous electrolyte, and film jacket, materials similar to those enumerated above in the explanation of the first and second nonaqueous electrolyte secondary battery can be used.

The sixth nonaqueous electrolyte secondary battery according to the present invention comprises an electrode group having a structure formed by folding positive and negative electrodes twice or more with a separator interposed between them, a nonaqueous electrolyte with which the electrode group is impregnated, and a film jacket in which the electrode group is housed. The positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator. A surface of the electrode group to which a stacked structure is exposed has a shape meeting relation (II) described above.

As the positive electrode, negative electrode, separator, nonaqueous electrolyte, and film jacket, materials similar to those enumerated above in the explanation of the first and second nonaqueous electrolyte secondary battery can be used.

The fifth and sixth nonaqueous electrolyte secondary batteries are manufactured by the following method.

(First Step)

An electrode group is manufactured by any of methods (a) to (c) below.

(a) Positive and negative electrodes are spirally wound with a separator interposed between them.

(b) Positive and negative electrodes are spirally wound with a separator interposed between them, and the coil is compressed in the direction of diameter.

(c) Positive and negative electrodes are folded twice or more with a separator interposed between them.

The positive and negative electrodes are manufactured in the same manners as explained in the aforementioned nonaqueous electrolyte secondary battery manufacturing method (A).

When the electrode group is formed by any of the above methods, in a second step (to be described below) it is possible to allow a solution of an adhesive polymer to permeate the positive electrode, negative electrode, and separator and at the same time prevent this solution from permeating the whole boundary between the positive electrode and the separator and the whole boundary between the negative electrode and the separator. Consequently, the adhesive polymer can be dispersedly present in the positive electrode, negative electrode, and separator and can dispersedly present in a boundary between the positive electrode and the separator and in a boundary between the negative electrode and the separator.

(Second Step)

The electrode group is housed in a bag-like film jacket. In this case it is desirable that the stacked section of this electrode group be seen through the opening of the jacket. A solution prepared by dissolving an adhesive polymer in a solvent is injected into the electrode group in the jacket to impregnate the electrode group with the solution.

As the adhesive polymer, solvent, and film jacket, materials similar to those enumerated above in the explanation of the nonaqueous electrolyte secondary battery manufacturing method.

(Third Step)

The electrode group is molded while being heated to set 40 to 120° C. Thereby, the ratio $L_2/L_1$ and the ratio $L_4/L_3$ become 0.9 to 1.2.

This step adheres the positive electrode, negative electrode, and separator and adheres the electrode group to the inner surface of the jacket. Also, a part or all of the adhesive polymer contained in the electrode group forms a porous structure because the solvent in the solution evaporate. Additionally, the water contained in the electrode group is removed.

The electrode group can contain a slight amount of a solvent.

This molding is desirably performed such that the electrode group is compressed in the direction of diameter if it is formed by method (a), and is compressed in the direction of stacking if it is formed by method (b) or (c).

The molding can be performed by press molding or forcing into a mold.

The electrode group is heated when it is molded for the reasons explained below. In the electrode group, the adhesive polymer dispersedly present in a boundary between the positive electrode and the separator and in a boundary between the negative electrode and the separator. If this electrode group is molded at room temperature, spring back occurs after the molding, i.e., gaps are formed between the positive electrode and the separator and between the negative electrode and the separator. Consequently, the ratio $L_2/L_1$ and the ratio $L_4/L_3$ become larger than 1.2. When the electrode group is molded at 40° C. or higher, the binders and the adhesive polymers contained in the positive and negative electrodes can be thermally set, so the hardness of the electrode group can be increased. Since this suppresses the spring back after the molding, the ratio $L_2/L_1$ and the ratio $L_4/L_3$ can be decreased to 1.2 or less. On the other hand, if the temperature of the electrode group exceeds 120° C., the separator may greatly thermally shrink. The temperature is more preferably 60 to 100° C.

The molding by heating to a specific temperature described above can be performed at normal pressure or reduced pressure or in a vacuum. This heat molding is desirably performed at reduced pressure or in a vacuum because the efficiency of water removal from the electrode group improves.

When the molding is performed by press molding, the pressure is preferably set to between 0.01 and 20 kg/cm$^2$ for the following reasons. If the pressure is lower than 0.01 kg/cm$^2$, the ratio $L_2/L_1$ and the ratio $L_4/L_3$ become larger than 1.2. If the pressure is higher than 20 kg/cm$^2$, the ratio $L_2/L_1$ and the ratio $L_4/L_3$ become smaller than 0.9.

(Fourth Step)

After a nonaqueous electrolyte is injected into the electrode group in the jacket, the opening of the jacket is sealed to complete the fifth or sixth nonaqueous electrolyte secondary battery.

In the above manufacturing method, after the electrode group is housed in the jacket the solution of the adhesive polymer is injected. However, this solution can also be injected before the electrode group is housed in the jacket. If this is the case, an electrode group is manufactured in the first step. This electrode group is impregnated with the solution and molded while being heated to set 40 to 120° C. After this electrode group is housed in the jacket, the nonaqueous electrolyte is injected, and the opening of the jacket is sealed to manufacture the fifth or sixth nonaqueous electrolyte secondary battery.

The seventh nonaqueous electrolyte secondary battery according to the present invention comprises an electrode group comprising a stack constructed of at least one positive electrode, at least one negative electrode, at least one separator, and at least two adhesive layers, one interposed between the positive electrode and the separator and another between the negative electrode and the separator. The battery further comprises a nonaqueous electrolyte with which the electrode group is impregnated and a film jacket in which the electrode group is housed.

The at least one separator contains 10 wt % or less of an adhesive polymer. All end portions of the at least one separator protrude compared with an end portion of the at least one positive electrode or an end portion of the at least one negative electrode.

As the positive electrode, negative electrode, nonaqueous electrolyte, and film jacket, materials analogous to those enumerated above in the explanation of the third nonaqueous electrolyte secondary battery can be used. The separator and the adhesive layer will be described below.

(1) Separator

The separator is made of a porous sheet holding at least an adhesive polymer in place. The content of this adhesive polymer in the separator is 10 wt % or less (including 0 wt %). All end portions of the separator protrude compared with the end portion of the positive electrode or the end portion of the negative electrode.

As the porous sheet, materials similar to those enumerated above in the explanation of the separator of the first and second nonaqueous electrolyte secondary battery can be used.

As the adhesive polymer, materials similar to those enumerated above in the explanation of the separator of the first and second nonaqueous electrolyte secondary battery can be used.

The content of the adhesive polymer in the separator is defined within the above range for the reasons explained below. If the content is larger than 10 wt %, the internal resistance of the secondary battery rises, and the cycle life becomes difficult to improve. The content is more preferably 5 wt % or less and, most preferably, 1 wt % or less. When the content of the adhesive polymer is $1 \times 10^{-5}$ wt % or more, the adhesion strength between the positive electrode and the separator and between the negative electrode and the separator can be improved. The lower limit of the content is more preferably $1 \times 10^{-4}$ wt % and, most preferably, $1 \times 10^{-3}$ wt %.

In this separator, the adhesive polymer can have concentration variations although it can also uniformly exist. Desirably, the concentration of the adhesive polymer in the interior is lower than the concentration of the adhesive polymer on the surface opposing the positive or negative electrode. It is particularly preferable that the concentration of the adhesive polymer in a central portion in the direction of thickness of the separator be lower than the concentration of the adhesive polymer on the surface opposing the positive or negative electrode.

When at least one end portion of the positive electrode protrudes compared with the negative electrode or at least one end portion of the negative electrode protrudes compared with the positive electrode, all end portions of the separator desirably protrude compared with this protruding electrode. With this arrangement, the internal short circuit occurrence frequency can be further reduced. It is particularly preferable that at least one end portion of the negative electrode protrude compared with the positive electrode and all end portions of the separator protrude compared with this negative electrode. With this arrangement, it is possible to further reduce the internal short circuit occurrence frequency and further improve the cycle life.

The end portion of the separator preferably holds the adhesive polymer in place. Since this arrangement can increase the strength of the protruding separator end portion, the internal short circuit occurrence frequency can be further reduced.

The protrusion length of the separator end portion is preferably 0.25 to 2 mm for the reasons explained below. If the protrusion length is shorter than 0.25 mm, the internal short circuit occurrence frequency may become difficult to reduce. On the other hand, if the protrusion length exceeds 2 mm, the volume energy density of the battery may decrease. A more favorable range is 0.5 to 1.5 mm. However, when at least one end portion of the positive electrode protrudes compared with the negative electrode or at least one end portion of the negative electrode protrudes compared with the positive electrode, the protrusion length is set on the basis of this protruding electrode end portion.

(2) Adhesive Layer

This adhesive layer contains an adhesive polymer. As this adhesive polymer, materials similar to those enumerated above in the explanation of the first nonaqueous electrolyte secondary battery can be used.

The adhesive layer preferably takes a porous structure. The adhesive layer having a porous structure can increase the nonaqueous electrolyte holding amount in the electrode group.

Figure 10:
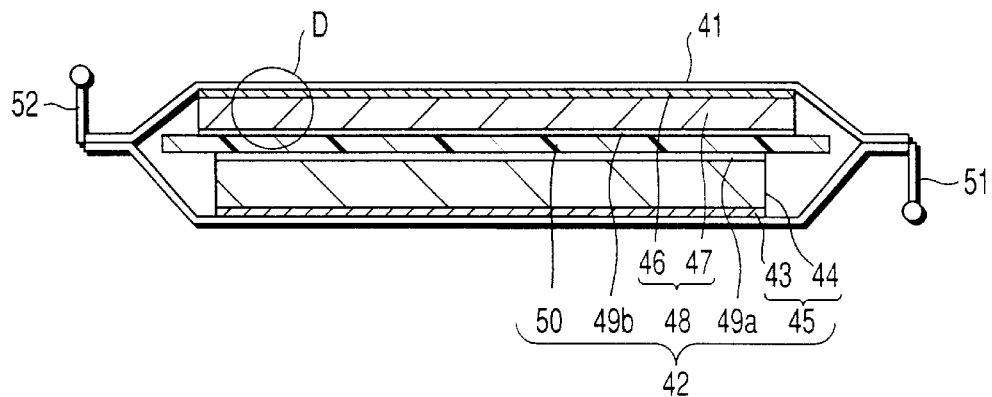
FIG. 10 is a sectional view showing an example of the seventh nonaqueous electrolyte secondary battery according to the present invention.
Figure 11:
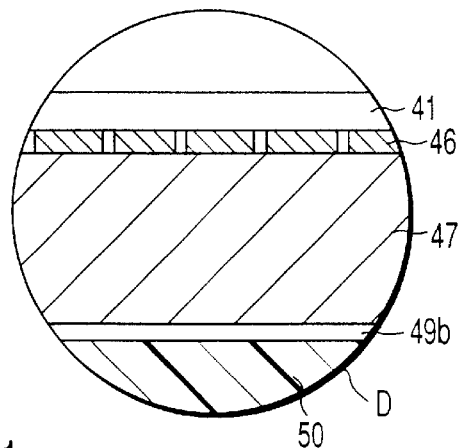
FIG. 11 is an enlarged sectional view showing a portion D in FIG. 10.

A thin lithium ion secondary battery as an example of the seventh nonaqueous electrolyte secondary battery according to the present invention will be described below with reference to FIGS. 10 and 11.

A film jacket 41 houses an electrode group 42 having a stacked structure. This electrode group 42 includes a positive electrode 45, a negative electrode 48, porous adhesive layers 49a and 49b, and a separator 50. The positive electrode 45 has a structure in which a positive electrode layer 44 is carried by a collector 43 such as a porous conductive substrate. The negative electrode 48 has a structure in which a negative electrode layer 47 is carried by a collector 46 such as a porous conductive substrate. The porous adhesive layers 49a and 49b are adhered to the positive electrode layer 44 and the negative electrode layer 47, respectively. These porous adhesive layers 49a and 49b are also adhered to the two surfaces of the separator 50. All end portions of the negative electrode 48 protrude compared with the positive electrode 45. The separator 50 contains 10 wt % or less (including 0 wt %) of an adhesive polymer. All end portions of this separator 50 protrude compared with the negative electrode 48. A nonaqueous electrolyte is contained in the jacket 41. One end of a positive terminal 51 is connected to the positive electrode 45, and its other end extends from the jacket 41. One end of a negative terminal 52 is connected to the negative electrode 48, and its other end extends from the jacket 41.

In the first nonaqueous electrolyte secondary battery according to the present invention as described above, since the adhesive polymer can be held at least in the void surrounded by the positive electrode and the separator, the void surrounded by the negative electrode and the separator, and each of the void of positive electrode, the void of negative electrode and the void of separator, the adhesive polymer can be distributed in the form of a three-dimensional network at least inside the electrode group. Consequently, while the positive electrode is brought in direct contact with one surface of the separator and the negative electrode is brought in direct contact with the other surface of the separator, the positive electrode, the negative electrode, and the separator can be adhered to each other, even when the film jacket is used, it is possible to keep the positive electrode, negative electrode, and separator well adhered to each other and suppress increase in the internal resistance resulting from the adhesive polymer. Furthermore, the lithium ion conductivity of the separator can be improved if the separator contains a material in which at least the adhesive polymer is held by a porous sheet having an air permeability of 600 sec/100 cm$^3$ or less. Consequently, it is possible to provide a nonaqueous electrolyte secondary battery which has a high capacity, an excellent large discharge characteristics, and a long cycle life. In addition, since a film jacket can be used, a thin nonaqueous electrolyte secondary battery which has a thickness of 4 mm or less, a high capacity, an excellent large discharge characteristics, and a long cycle life can be realized.

When a film is used as a jacket in the secondary battery according to the present invention, this jacket can be fixed to the electrode group by adhering the electrode group to the inner surface of the film jacket by an adhesive layer formed on at least a portion of the surface of the electrode group. Consequently, it is possible to prevent the nonaqueous electrolyte from permeating boundary between the electrode group and the jacket.

In this secondary battery according to the present invention, the total amount of adhesive polymers is set to between 0.2 and 6 mg per 100 mAh battery capacity. This can further improve the adhesion strength between the positive electrode and the separator and between the negative electrode and the separator while reducing the internal resistance. As a consequence, the large discharge characteristic and the cycle life of the secondary battery can be further improved.

By decreasing the thickness of the separator to 30 μm or less, the internal resistance of the secondary battery can be further reduced. This can further improve the large discharge characteristic and the cycle life of the secondary battery.

By setting the heat shrinkage ratio of the separator upon being left to stand at 120° C. for 1 hr to 20% or less, the adhesion strength between the positive electrode and the separator and between the negative electrode and the separator can be further improved. Hence, the large discharge characteristic and the cycle life of the secondary battery can be further improved.

By setting the porosity of the separator to 30 to 60%, both the separator strength and the electrolyte holding characteristic can be satisfied. This can further improve the large discharge characteristic and the cycle life.

As the negative electrode, a material containing a carbonaceous material which absorbs and desorbs lithium ions is used. Therefore, it is possible to avoid the problem of lithium dendrite that easily occurs in a thin nonaqueous electrolyte secondary battery including a negative electrode made from lithium metal or a lithium alloy.

By using the carbonaceous material having a graphite crystal in which an interplanar spacing $d_{002}$ derived from (002) reflection is 0.340 nm or less, the capacity and the large discharge characteristic of the secondary battery can be further improved.

Also, in at least one of the positive and negative electrodes, a conductive substrate having a porous structure in which pores 3 mm or less in diameter are present at a ratio of one or more pores per 10 cm$^2$ is used as a collector. Since this allows the nonaqueous electrolyte to evenly penetrate into the electrode group while ensuring necessary electrode strength, the cycle life of the secondary battery can be further improved.

The second nonaqueous electrolyte secondary battery according to the present invention described above comprises an electrode group comprising a positive electrode, a negative electrode, and a separator for separating the positive and negative electrodes from each other, a jacket for housing the electrode group, and a nonaqueous electrolyte with which the electrode group is impregnated. The positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator. In this secondary battery, a portion of the positive electrode and a portion of the negative electrode can be directly brought into contact with the separator. Therefore, it is possible to reduce the internal resistance resulting from the adhesive polymer and improve the adhesion strength between the positive electrode and the separator and between the negative electrode and the separator. The adhesion strength is improved probably because the adhesive polymer is distributed in the form of a three-dimensional network inside the electrode group. As a consequence, a nonaqueous electrolyte secondary battery having a high capacity, a good large discharge characteristic, and a long cycle life can be provided. When the film jacket is used, the electrode group can keep the positive electrode, negative electrode, and separator well adhered to each other over long time periods. Accordingly, it is possible to realize a thin nonaqueous electrolyte secondary battery which is as thin as, e.g., 4 mm or less and has a high capacity, a good large discharge characteristic, and a long cycle life.

In this secondary battery according to the present invention, the content of the adhesive polymer in the separator is not more than 10 wt %. This can increase the ion conductivity of the nonaqueous electrolyte while maintaining high adhesion strength between the positive electrode and the separator and between the negative electrode and the separator. Consequently, the large discharge characteristic and the cycle life can be further improved.

In this secondary battery according to the present invention, the concentration of the adhesive polymer inside the separator is set lower than that of the adhesive polymer on the surface opposing the positive or negative electrode. This can reduce the internal resistance while maintaining high adhesion strength between the positive electrode and the separator and between the negative electrode and the separator. Consequently, the large discharge characteristic and the cycle life can be further improved.

In this secondary battery according to the present invention, the total amount of adhesive polymers is set to between 0.2 and 6 mg per 100 mAh battery capacity. This can further improve the adhesion strength between the positive electrode and the separator and between the negative electrode and the separator while reducing the internal resistance. As a consequence, the large discharge characteristic and the cycle life of the secondary battery can be further improved.

In this secondary battery according to the present invention, when the total amount of adhesive polymers is set between 0.2 and 6 mg per 100 mAh battery capacity, the amount of nonaqueous electrolyte is set to between 0.2 to 0.6 g per 100 mAh battery capacity. This can improve the large discharge characteristic and the cycle life and also allows the use of a film jacket to thereby decrease the thickness of the secondary battery.

When a film is used as a jacket in the secondary battery according to the present invention, this jacket can be fixed to the electrode group by adhering the electrode group to the inner surface of the film jacket by an adhesive layer formed on at least a portion of the surface of the electrode group. Consequently, it is possible to prevent the nonaqueous electrolyte from permeating boundary between the electrode group and the jacket.

In the second nonaqueous electrolyte secondary battery according to the present invention, the lithium ion conductivity of the separator can be improved if -the separator contains a material in which at least the adhesive polymer is held by a porous sheet having an air permeability of 600 sec/100 cm$^3$ or less. Consequently, the capacity, the large discharge characteristics, and the cycle life of the secondary battery can be further improved.

By decreasing the thickness of the separator to 30 μm or less, the internal resistance of the secondary battery can be further reduced. This can further improve the large discharge characteristic and the cycle life of the secondary battery.

By setting the heat shrinkage ratio of the separator upon being left to stand at 120° C. for 1 hr to 20% or less, the adhesion strength between the positive electrode and the separator and between the negative electrode and the separator can be further improved. Hence, the large discharge characteristic and the cycle life of the secondary battery can be further improved.

By setting the porosity of the separator to 30 to 60%, both the separator strength and the electrolyte holding characteristic can be satisfied. This can further improve the large discharge characteristic and the cycle life.

As the negative electrode, a material containing a carbonaceous material which absorbs and desorbs lithium ions is used. Therefore, it is possible to avoid the problem of lithium dendrite that easily occurs in a thin nonaqueous electrolyte secondary battery including a negative electrode made from lithium metal or a lithium alloy.

By using the carbonaceous material having a graphite crystal in which an interplanar spacing $d_{002}$ derived from (002) reflection is 0.340 nm or less, the capacity and the large discharge characteristic of the secondary battery can be further improved.

Also, in at least one of the positive and negative electrodes, a conductive substrate having a porous structure in which pores 3 mm or less in diameter are present at a ratio of one or more pores per 10 cm$^2$ is used as a collector. Since this allows the nonaqueous electrolyte to evenly penetrate into the electrode group while ensuring necessary electrode strength, the cycle life of the secondary battery can be further improved.

In the nonaqueous electrolyte secondary battery manufacturing method of the present invention, an electrode group formed by interposing a separator between positive and negative electrodes is impregnated with a solution in which an adhesive polymer is dissolved, and then the electrode group is molded. Therefore, it is possible to strongly adhere the positive electrode, negative electrode, and separator while reducing the internal resistance resulting from the adhesive polymer. Accordingly, by impregnating the electrode group with the nonaqueous electrolyte and housing this electrode group in a desired jacket, it is possible to easily manufacture a thin nonaqueous electrolyte secondary battery having a high energy density, a good large discharge characteristic, and a long cycle life.

In this manufacturing method according to the present invention, a solution of an adhesive polymer is injected with an electrode group housed in a film jacket. This achieves the effects of reducing the internal resistance and improving the adhesion strength. In addition, the electrode group can be adhered to the inner surface of the film jacket, so the jacket can be fixed to the electrode group. As a consequence, it is possible to prevent the nonaqueous electrolyte from permeating boundary between the electrode group and the jacket.

In the manufacturing method according to the present invention, an electrode group is impregnated with a solution in which an adhesive polymer is dissolved, and then the electrode group is dried to evaporate a solvent in the solution. An adhesive region comprising adhesive polymers is formed, and a part or all of the adhesive region takes a porous structure. Since this adhesive region is allowed to hold the nonaqueous electrolyte in the voids, it can contribute to the conduction of lithium ions. Consequently, since it can improve the lithium ion conductivity of the secondary battery, the discharge capacity, the large discharge characteristics, and the cycle life of the second battery can be improved.

In this manufacturing method according to the present invention, it is possible by setting the drying temperature at 100° C. or less to suppress heat shrinkage of the separator, particularly the separator containing polyethylene or polypropylene. Since this can further improve the adhesion strength between the positive electrode, negative electrode, and separator, the large discharge characteristic and the cycle life of the secondary battery can be further improved.

When the drying is performed at 100° C. or less, the evaporation rate of the solvent can be increased by using an organic solvent having a boiling point of 200° C. or less as the solvent. This can decrease the influence of heat on the separator and further increase the adhesion strength between the positive and negative electrodes and the separator.

Also, when the drying is performed at 100° C. or less, the heat shrinkage of the separator can be further decreased by setting the heat shrinkage ratio of the separator upon being left to stand at 120° C. for 1 hr to 20% or less. Consequently, the adhesion strength between the positive and negative electrodes and the separator can be further increased.

The third nonaqueous electrolyte secondary battery according to the present invention comprises an electrode group having a structure formed by spirally winding a positive electrode and a negative electrode with a separator interposed between them and compressing the resultant coil in the direction of diameter, a nonaqueous electrolyte with which the electrode group is impregnated, and a film jacket in which the electrode group is housed. A surface of the electrode group to which a stacked structure is exposed has a shape meeting relation (I) presented earlier.

That is, with the progress of charge/discharge cycle an electrode group of a nonaqueous electrolyte secondary battery repeatedly expands and shrinks in the stacking direction. A film jacket has no large effect of suppressing this expansion/shrinkage and hence deforms substantially following the expansion/shrinkage of the electrode group. Meanwhile, the separator which does not contain an adhesive polymer can increase the ion conductivity of the nonaqueous electrolyte. However, when the film jacket is used as a jacket of the electrode group which includes the separator not containing the adhesive polymer, the contact area of a positive electrode, negative electrode, and separator reduces with the progress of charge/discharge cycle. This increases the internal resistance and decreases the life.

According to the present invention, the positive electrode and the separator containing no adhesive polymer, and the negative electrode and the separator containing no adhesive polymer, can be well brought into contact with each other for long time periods when the film jacket is used. Since this suppresses an increase in the internal impedance with the progress of charge/discharge cycle, the charge/discharge cycle life can be improved. It is also possible to improve the capacity recovery ratio of the secondary battery after high-temperature storage. Furthermore, a long life can be ensured even when the thickness of the film jacket is set to between 50 to 300 $\mu$m, so a thin long-life nonaqueous electrolyte secondary battery can be provided.

In the third nonaqueous electrolyte secondary battery according to the present invention, the separator is made from at least one type of material selected from polyolefin and cellulose. This can reduce the internal resistance of the separator, and the lithium ion conductivity of the separator can be further improved. Consequently, the discharge capacity and the charge/discharge cycle life of the secondary battery can be further improved.

In the third nonaqueous electrolyte secondary battery according to the present invention, when the separator is made from a porous sheet having an air permeability of 600 sec/100 cm$^3$, the lithium ion conductivity of the separator can be increased. Consequently, the discharge capacity and the charge/discharge cycle life of the secondary battery can be further improved.

The fourth nonaqueous electrolyte secondary battery according to the present invention comprises an electrode group having a structure formed by folding a positive electrode and a negative electrode twice or more with a separator interposed between them, a nonaqueous electrolyte with which the electrode group is impregnated, and a film jacket in which the electrode group is housed. A surface of the electrode group to which a stacked structure is exposed has a shape meeting relation (II) presented earlier.

In this secondary battery, the positive electrode and the separator containing no adhesive polymer, and the negative electrode and the separator containing no adhesive polymer, can be well brought into contact with each other for long time periods in the electrode group housed in the film jacket. Since this suppresses an increase in the internal impedance with the progress of charge/discharge cycle, the charge/discharge cycle life can be improved. It is also possible to improve the capacity recovery ratio of the secondary battery after high-temperature storage. Furthermore, a long life can be ensured even when the thickness of the film jacket is set between 50 and 300 $\mu$m, so a thin long-life nonaqueous electrolyte secondary battery can be provided.

In the fourth nonaqueous electrolyte secondary battery according to the present invention, the separator is made from at least one type of material selected from polyolefin and cellulose. This can reduce the internal resistance of the separator, and the lithium ion conductivity of the separator can be further improved. Consequently, the discharge capacity and the charge/discharge cycle life of the secondary battery can be further improved.

In the fourth nonaqueous electrolyte secondary battery according to the present invention, when the separator is made from a porous sheet having an air permeability of 600 sec/100 cm$^3$, the lithium ion conductivity of the separator can be increased. Consequently, the discharge capacity and the charge/discharge cycle life of the secondary battery can be further improved.

Another nonaqueous electrolyte secondary battery manufacturing method according to the present invention comprises the steps of forming an electrode group by interposing a separator made from at least one type of material selected from polyolefin and cellulose between a positive electrode and a negative electrode, molding the electrode group under heating, and impregnating the electrode group with a nonaqueous electrolyte. In the heat molding step of this method, the binders contained in the positive and negative electrodes can be thermally set. So, after the molding it is possible to avoid the positive electrode, negative electrode, and separator from recovering the thickness before the molding. Consequently, the positive electrode, negative electrode, and separator can be well brought into contact with each other, and this state can be maintained even when the electrode group repeatedly expands and shrinks with the progress of charge/discharge cycle. Since this suppresses an increase in the internal resistance with the progress of charge/discharge cycle, the charge/discharge cycle life can be improved. Also, when the film jacket is used, the positive electrode, negative electrode, and separator can be kept well adhered to each other for long time periods. Accordingly, a long-life thin nonaqueous electrolyte secondary battery can be realized.

When the electrode group is molded in this manufacturing method according to the present invention, it is possible by setting the temperature of the electrode group at 40 to 120° C. to improve the contact between the positive electrode and the separator and between the negative electrode and the separator while avoiding large heat shrinkage of the separator. Consequently, the cycle life can be further improved.

The fifth nonaqueous electrolyte secondary battery according to the present invention comprises an electrode group having a structure formed by spirally winding a positive electrode and a negative electrode with a separator interposed between them and compressing the resultant coil in the direction of diameter, a nonaqueous electrolyte with which the electrode group is impregnated, and a film jacket in which the electrode group is housed. The positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator. A surface of the electrode group to which a stacked structure is exposed has a shape meeting relation (I) described above.

In this secondary battery, while the internal resistance of the electrode group is maintained at a small value, the positive electrode, negative electrode, and separator can be well kept in contact with each other for long time periods. Consequently, it is possible to greatly improve the initial capacity, cycle life, and large discharge characteristic of the secondary battery.

The sixth nonaqueous electrolyte secondary battery according to the present invention comprises an electrode group having a structure formed by folding positive and negative electrodes twice or more with a separator interposed between them, a nonaqueous electrolyte with which the electrode group is impregnated, and a film jacket in which the electrode group is housed. The positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator. A surface of the electrode group to which a stacked structure is exposed has a shape meeting relation (II) described above.

In this secondary battery, while the internal resistance of the electrode group is maintained at a small value, the positive electrode, negative electrode, and separator can be well kept in contact with each other for long time periods. Consequently, it is possible to greatly improve the initial capacity, cycle life, and large discharge characteristic of the secondary battery.

The seventh nonaqueous electrolyte secondary battery according to the present invention comprises an electrode group comprising a stack comprising at least one positive electrode, at least one negative electrode, at least one separator, and at least two adhesive layers, one interposed between the positive electrode and the separator and another between the negative electrode and the separator, a nonaqueous electrolyte with which the electrode group is impregnated, and a film jacket in which the electrode group is housed. The at least one separator contains 10 wt % or less (including 0 wt %) of an adhesive polymer. An end portion of the separator protrudes compared with an end portion of the at least one positive electrode or an end portion of the at least one negative electrode.

In this secondary battery, the occurrence of internal short circuit can be prevented when a shock is applied to the battery because, e.g., the battery is dropped by mistake and when the separator thermally shrinks because the battery is used in a high-temperature environment. Also, since the internal resistance can be reduced, the charge/discharge cycle life can be improved.

In this secondary battery of the present invention, the protrusion length of the separator is set between 0.25 and 2 mm. This can further reduce the internal short circuit occurrence ratio while maintaining high volume energy density.

Preferred examples of the present invention will be described in detail below.

EXAMPLE 1
<Manufacture of Positive Electrode>

First, 91 wt % of a lithium cobalt oxide ($Li_xCoO_2$: $0 \leq X \leq 1$) powder, 3.5 wt % of acetylene black, 3.5 wt % of graphite, 2 wt % of an ethylenepropylenediene monomer (EPDM) powder as a binder, and toluene were mixed. The two surfaces of a collector made of a porous aluminum foil (15 μm thick) having 0.5 mm diameter pores at a ratio of 10 pores per 10 $cm^2$ were coated with the resultant mixture. This collector was pressed to manufacture a positive electrode having an electrode density of 3 $g/cm^3$ in which positive electrode layers were carried by the two surfaces of the collector.

<Manufacture of Negative Electrode>

93 wt % of a powder of mesophase pitch-based carbon fibers heat-treated at 3,000° C. (fiber diameter=8 μm, average fiber length=20 μm, and average interplanar spacing ($d_{002}$)=0.3360 nm) as a carbonaceous material and 7 wt % of polyvinylidene fluoride (PVdF) as a binder were mixed. A collector made of a porous copper foil (15 μm thick) having 0.5 mm diameter pores at a ratio of 10 pores per 10 $cm^2$ was coated with the resultant mixture. This collector was dried and pressed to manufacture a negative electrode (A) having an electrode density of 1.3 $g/cm^3$ in which negative electrode layer were carried by the surface of the collector. Meanwhile, the two surfaces of a collector made of a porous copper foil (15 μm thick) having 0.5 mm diameter pores at a ratio of 10 pores per 10 $cm^2$ was coated with the resultant mixture. This collector was dried and pressed to manufacture a negative electrode (B) having an electrode density of 1.3 $g/cm^3$ in which negative electrode layers were carried by the two surfaces of the collector.

<Separator>

A separator made of a porous polyethylene film which had a thickness of 25 μm, a heat shrinkage of 20% upon being left to stand at 120° C. for 1 hr, and a porosity of 50% was prepared.

<Preparation of Nonaqueous Electrolyte>

A nonaqueous electrolyte was prepared by dissolving 1 mol/l of lithium hexafluorophosphate ($LiPF_6$) in a solvent mixture (mixing volume ratio 1:2) of ethylene carbonate (EC) and methylethyl carbonate (MEC).

<Manufacture of Electrode Group>

A band-like positive electrode lead was welded to the collector of the positive electrode, and a band-like negative electrode lead was welded to the collector of the negative electrode. Subsequently, the positive electrode, negative electrodes (A) and (B), and separator were stacked in the order of the separator, positive electrode, separator, negative electrode (B), separator, positive electrode, separator and negative electrode (A). The obtained stack was spirally wound. The spiral or coil was molded into a flat shape to manufacture an electrode group.

A 100 μm thick laminate film formed by covering the two surfaces of an aluminum foil with polypropylene was molded into a bag shape. The electrode group was housed in this bag such that the stacked section was seen through the opening of the bag. 0.5 wt % of polyacrylonitrile (PAN) as an adhesive polymer was dissolved in dimethylformamide (boiling point=153° C.) as an organic solvent. The resultant solution was injected into the electrode group in the laminate film such that the amount per 100 mAh battery capacity was 0.25 ml. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. The total amount of PAN per 100 mAh battery capacity was 1.25 mg. Note that the total amount of adhesive polymer per 100 mAh battery capacity was calculated from an increase in the weight from that of the electrode group before impregnating the electrode group with the adhesive polymer solution.

The nonaqueous electrolyte was injected into the electrode group in the laminate film such that the amount per 1 Ah battery capacity was 4.1 g (0.41 g per 100 mAh), thereby assembling a thin nonaqueous electrolyte secondary battery 3 mm thick, 40 mm wide, and 70 mm high, having the structure shown in FIGS. 1 and 2 described earlier.

EXAMPLE 2

A thin nonaqueous electrolyte secondary battery was assembled following the same procedures as in Example 1 except that aluminum was used as the negative electrode.

EXAMPLE 3

An electrode group manufactured in the same manner as in Example 1 was housed in a molded laminate film bag such that the stacked section was seen through the opening of the bag. 0.5 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 40° C. for 24 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

EXAMPLE 4

A thin nonaqueous electrolyte secondary battery was assembled following the same procedures as in Example 3 except that the vacuum drying conditions were 80° C. and 12 hr.

EXAMPLE 5

A thin nonaqueous electrolyte secondary battery was assembled following the same procedures as in Example 3 except that the vacuum drying conditions were 100° C. and 6 hr.

EXAMPLE 6

A thin nonaqueous electrolyte secondary battery was assembled following the same procedures as in Example 3 except that aluminum was used as the negative electrode.

EXAMPLE 7

An electrode group manufactured in the same manner as in Example 1 was housed in a molded laminate film bag such that the stacked section was seen through the opening of the bag. 0.1 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

EXAMPLE 8

An electrode group manufactured in the same manner as in Example 1 was housed in a molded laminate film bag such that the stacked section was seen through the opening of the bag. 1 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

EXAMPLE 9

An electrode group manufactured in the same manner as in Example 1 was housed in a molded laminate film bag such that the stacked section was seen through the opening of the bag. 2.5 wt % of polyvinylidene fluoride (PVdF) as an adhesive polymer were dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

EXAMPLE 10

An electrode group manufactured in the same manner as in Example 1 was housed in a molded laminate film bag such that the stacked section was seen through the opening of the bag. 1 wt % of polyacrylate (PMMA) as an adhesive polymer was dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

EXAMPLE 11

An electrode group manufactured in the same manner as in Example 1 was housed in a molded laminate film bag such that the stacked section was seen through the opening of the bag. 0.5 wt % of polyvinyl chloride (PVC) as an adhesive polymer was dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the-amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

EXAMPLE 12

An electrode group manufactured in the same manner as in Example 1 was housed in a molded laminate film bag such that the stacked section was seen through the opening of the bag. 0.5 wt % of polyethylene oxide (PEO) as an adhesive polymer was dissolved in dimethylformamide (boiling point=153° C.) as an organic solvent. The resultant solution was injected into the electrode group in the laminate film such that the amount per 100 mAh battery capacity was the same as in Example 1. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 2-1 shows the total amount of adhesive polymers per 100 mAh battery capacity.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high, having the structure shown in FIGS. 1 and 2 described earlier.

COMPARATIVE EXAMPLE 1

An electrode group manufactured in the same manner as in Example 1 was housed in a molded laminate film bag such that the stacked section was seen through the opening of the bag. This electrode group was vacuum-dried at 80° C. for 12 hr. The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high.

COMPARATIVE EXAMPLE 2

A separator was manufactured by impregnating non-woven fabric with a gel electrolyte (prepared by mixing polyacrylonitrile (PAN), $LiPF_6$, EC, and MEC at a molar ratio of PAN:$LiPF_6$:EC:MEC=16:5:55:24) instead of a non-aqueous electrolyte.

Positive and negative electrodes identical with those explained in Example 1 were spirally wound with this separator interposed between them. The coil was molded into a flat shape to manufacture an electrode group. This electrode group was housed in a molded laminate film bag such that the stacked section was seen through the opening of the bag. The electrode group was then vacuum-dried at 80° C. for 12 hr. The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high.

COMPARATIVE EXAMPLE 3

3 wt % of polyvinylidene fluoride (PVdF) as an adhesive polymer were dissolved in dimethylformamide (boiling point=153° C.) as an organic solvent. The two surfaces of a separator identical with that explained in Example 1 were coated with the resultant solution. A stack was manufactured by interposing this separator between positive and negative electrodes identical with those explained in Example 1. This stack was vacuum-dried at 80° C. for 12 hr to form a porous adhesive layer between the positive electrode and the separator and between the negative electrode and the separator. The resultant stack was spirally wound, and the coil was molded into a flat shape to manufacture an electrode group.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high.

A charge/discharge cycle test was conducted in a 20° C. atmosphere on the secondary batteries of Examples 1, 3 to 5, and 7 to 12 and Comparative Examples 1 to 3 such that each secondary battery was charged to 4.2V for 5 hr by a charging current of 300 mA and discharged to 2.7V by 300 mA. The secondary batteries of Examples 2 and 6 were subjected to a charge/discharge cycle test in a 20° C. atmosphere such that each secondary battery was charged to 4.0V for 5 hr by a charging current of 300 mA and discharged to 2.7V by 300 mA. Table 2-2 below shows the discharge capacity (initial capacity) on the first cycle and the capacity maintenance ratio (with respect to the initial capacity) on the 300th cycle in each charge/discharge cycle test.

Also, after the batteries of Examples 1, 3 to 5, and 7 to 12 and Comparative Examples 1 to 3 were charged to 4.2V for 5 hr by a charging current of 300 mV and discharged to 2.7V by 2C, the discharge capacity of each battery was measured, and the ratio of this 2C discharge capacity to the initial capacity was calculated. Table 2-2 below shows the results as the 2C discharge rate capacity maintenance ratio. Meanwhile, the secondary batteries of Examples 2 and 6 were charged to 4.0v for 5 hr by a charging current of 300 mA and discharged to 2.7V by 2C, the discharge capacity of each battery was measured, and the 2C discharge rate capacity maintenance ratio was calculated. The results are also shown in Table 2-2.

TABLE 1

| | Type of adhesive polymer | Concentration (%) of adhesive polymer in solution | Temperature (° C.) of vacuum drying | Negative electrode |
|---|---|---|---|---|
| Example 1 | PAN | 0.5 | 80 | Carbonaceous material |
| Example 2 | PAN | 0.5 | 80 | Al |
| Example 3 | PVdF | 0.5 | 40 | Carbonaceous material |
| Example 4 | PVdF | 0.5 | 80 | Carbonaceous material |
| Example 5 | PVdF | 0.5 | 100 | Carbonaceous material |
| Example 6 | PVdF | 0.5 | 80 | Al |
| Example 7 | PVdF | 0.1 | 80 | Carbonaceous material |
| Example 8 | PVdF | 1 | 80 | Carbonaceous material |
| Example 9 | PVdF | 2.5 | 80 | Carbonaceous material |
| Example 10 | PMMA | 0.5 | 80 | Carbonaceous material |
| Example 11 | PVC | 0.5 | 80 | Carbonaceous material |
| Example 12 | PEO | 0.5 | 80 | Carbonaceous material |
| Comparative Example 1 | No adhesive polymer (nonaqueous electrolyte) | | | Carbonaceous material |
| Comparative Example 2 | No adhesive polymer (gel electrolyte) | | | Carbonaceous material |
| Comparative Example 3 | PVdF | 3.0 | 80 | Carbonaceous material |

TABLE 2-1

| | Total amount of adhesive polymer (mg) |
|---|---|
| Example 1 | 1.25 |
| Example 2 | 1.25 |
| Example 3 | 1.15 |
| Example 4 | 1.15 |
| Example 5 | 1.15 |
| Example 6 | 1.15 |
| Example 7 | 0.23 |
| Example 8 | 2.3 |
| Example 9 | 2.88 |
| Example 10 | 1.15 |
| Example 11 | 1.15 |
| Example 12 | 1.15 |

TABLE 2-2

| | Initial capacity (mAh) | Capacity maintenance ratio after 300 cycles (%) | 2C discharge rate capacity maintenance ratio (%) |
|---|---|---|---|
| Example 1 | 600 | 80 | 75 |
| Example 2 | 550 | 75 | 70 |
| Example 3 | 550 | 75 | 75 |
| Example 4 | 620 | 90 | 85 |
| Example 5 | 600 | 80 | 60 |
| Example 6 | 550 | 75 | 70 |
| Example 7 | 600 | 70 | 90 |
| Example 8 | 600 | 85 | 70 |
| Example 9 | 550 | 70 | 50 |
| Example 10 | 600 | 85 | 70 |
| Example 11 | 500 | 80 | 70 |
| Example 12 | 400 | 80 | 70 |
| Comparative Example 1 | 50 | 0 | 0 |
| Comparative Example 2 | 400 | 70 | 40 |
| Comparative Example 3 | 450 | 30 | 50 |

As is apparent from Tables 1 to 2-2, the secondary batteries of Examples 1 to 12 were superior in initial capacity and cycle life. In particular, the 2C large discharge capacity greatly improved compared with the secondary batteries of Comparative Examples 1 to 3.

By contrast, the secondary battery of Comparative Example 1 was far inferior to Examples 1 to 12 in initial capacity, cycle life, and large discharge capacity. The secondary battery of Comparative Example 2 was inferior to the secondary batteries of Examples 1 to 12 in 2C large current discharge capacity. The secondary battery of Comparative Example 3 was inferior to Examples 1 to 12 in initial capacity, cycle life, and large discharge capacity.

In the secondary batteries of Examples 6 to 9 and Comparative Examples 1 to 3, the concentration of the adhesive polymer in the separator was measured. Table 3 below shows the results.

TABLE 3

| | Type of adhesive polymer | Content of separator adhesive polymer (wt %) | Initial capacity (mAh) | Capacity maintenance ratio after 300 cycles (%) | 2c discharge rate capacity maintenance ratio (%) |
|---|---|---|---|---|---|
| Example 7 | PVdF | 0.2 | 600 | 70 | 90 |
| Example 6 | PVdF | 1.5 | 550 | 75 | 70 |
| Example 8 | PVdF | 3 | 600 | 85 | 70 |
| Example 9 | PVdF | 10 | 550 | 70 | 50 |
| Comparative 1 | — | 0 | 50 | 0 | 0 |
| Comparative 2 | — | 0 | 400 | 70 | 40 |
| Comparative 3 | PVdF | 15 | 450 | 30 | 50 |

In the secondary batteries of Examples 4 and 8 and Comparative Example 3, the concentration of the adhesive polymer was measured in a central portion in the direction of thickness of the separator, on the surface opposing the positive electrode, and on the surface opposing the negative electrode. Table 4 below shows the results.

TABLE 4

| | Concentration (wt %) of adhesive polymer | | |
|---|---|---|---|
| | Surface opposing positive electrode | Central portion | Surface opposing negative electrode |
| Example 4 | 2 | 1 | 2 |
| Example 8 | 4 | 1 | 4 |
| Comparative Example 3 | 12 | 15 | 12 |

As shown in Table 4, in the secondary batteries of Examples 4 and 8, the adhesive polymer concentration in the interior of the separator was lower than the adhesive polymer concentration on the surface opposing the positive or negative electrode. By contrast, in the secondary battery of Comparative Example 3, the adhesive polymer concentration in the interior of the separator was higher than the adhesive polymer concentration on the surface opposing the positive or negative electrode. This is so because in Comparative Example 3 the separator was directly coated with the adhesive polymer solution.

Example 12-1

A thin nonaqueous electrolyte secondary battery was assembled following the same procedures as in Example 4 except that a separator made from a porous polyethylene film having a thickness of 25 μm, a heat shrinkage of 20% upon being left to stand at 120° C. for 1 hr, air permeability of 90 sec/100 cm$^3$, and a porosity of 50%, was used.

Example 12-2

A thin nonaqueous electrolyte secondary battery was assembled following the same procedures as in Example 12-1 except that the air permeability of the porous polyethylene film was 580 sec/100 cm$^3$.

Example 12-3

A thin nonaqueous electrolyte secondary battery was assembled following the same procedures as in Example 12-1 except that the air permeability of the porous polyethylene film was 400 sec/100 cm$^3$.

Example 12-4

A thin nonaqueous electrolyte secondary battery was assembled following the same procedures as in Example 12-1 except that the air permeability of the porous polyethylene film was 150 sec/100 cm$^3$.

A charge/discharge cycle test was conducted in a 20° C. atmosphere on the secondary batteries of Examples 12-1 to 12-4 such that each secondary battery was charged to 4.2V for 5 hr by a charging current of 300 mA and discharged to 2.7V by 300 mA. Table 5 below shows the discharge capacity (initial capacity) on the first cycle and the capacity maintenance ratio (with respect to the initial capacity) on the 300th cycle in each charge/discharge cycle test.

Also, after the batteries of Examples 12-1 to 12-4 were charged to 4.2V for 5 hr by a charging current of 300 mV and discharged to 2.7V by 2C, the discharge capacity of each battery was measured, and the ratio of this 2C discharge capacity to the initial capacity was calculated. Table 5 below shows the results as the 2C discharge rate capacity maintenance ratio.

TABLE 5

| | Type of adhesive polymer | Air permeability (sec/100 cm$^3$) | Initial capacity (mAh) | Capacity maintenance ratio after 300 cycles (%) | 2c discharge rate capacity maintenance ratio (%) |
|---|---|---|---|---|---|
| Example 12-1 | PVdF | 90 | 620 | 90 | 85 |
| Example 12-2 | PVdF | 580 | 500 | 80 | 60 |
| Example 12-3 | PVdF | 400 | 520 | 83 | 70 |
| Example 12-4 | PVdF | 150 | 580 | 85 | 75 |

EXAMPLE 13

<Manufacture of Positive Electrode>

First, 91 wt % of a lithium cobalt oxide ($Li_xCoO_2$) powder, 3.5 wt % of acetylene black, 3.5 wt % of graphite, 2 wt % of an ethylenepropylenediene monomer powder, and toluene were mixed. The two surfaces of a collector made of a 30 μm thick aluminum foil were coated with the resultant mixture. This collector was pressed to manufacture a positive electrode having an electrode density of 3 g/cm$^3$ in which positive electrode layers were carried by the two surfaces of the collector.

<Manufacture of Negative Electrode>

93 wt % of a powder of mesophase pitch-based carbon fibers heat-treated at 3,000° C. (fiber diameter=8 μm, average fiber length=20 μm, and average interplanar spacing ($d_{002}$)=0.3360 nm) as a carbonaceous material and 7 wt % of polyvinylidene fluoride (PVdF) as a binder were mixed. The two surfaces of a 15 μm thick copper foil as a collector were coated with the resultant mixture. This collector was dried and pressed to manufacture a negative electrode having an electrode density of 1.3 g/cm$^3$ in which negative electrode layers were carried by the two surfaces of the collector.

An electrode group was manufactured by spirally winding the positive and negative electrodes with a separator made of a 15 μm thick porous polyethylene film interposed between them.

This electrode group was housed in a stainless-steel, closed-end cylindrical vessel. 0.1 wt % of polyvinylidene fluoride (PVdF) as an adhesive polymer was dissolved in dimethylformamide (boiling point=153° C.) as an organic solvent. The resultant solution was injected into the electrode group in the vessel such that the amount per 100 mAh battery capacity was 0.25 ml. In this manner, the solution was allowed to penetrate into the electrode group and adhere to the entire surfaces of the electrode group.

Next, the electrode group in the vessel was vacuum-dried at 80° C. for 12 hr to evaporate the organic solvent. In this electrode group, the adhesive polymer was held in each of the void of the positive electrode, the void of the negative electrode, and the void of the separator. A porous adhesive layer was formed on the surfaces of the electrode group. Table 6 (to be presented later) shows the total amount of adhesive polymers per 100 mAh battery capacity.

A nonaqueous electrolyte identical with that explained in Example 1 was injected into the electrode group in the vessel such that the amount per 1 Ah battery capacity was 3.8 g, and sealing of the opening and the like were performed, thereby assembling a cylindrical nonaqueous electrolyte secondary battery.

COMPARATIVE EXAMPLE 4

An electrode group was manufactured by spirally winding positive and negative electrodes identical with those explained in Example 13 with a separator made of a 25 $\mu$m thick porous polyethylene film interposed between them.

This electrode group was housed in a stainless-steel, closed-end cylindrical vessel. A nonaqueous electrolyte identical with that explained in Example 1 was injected into the electrode group in the vessel such that the amount per 1 Ah battery capacity was 3.8 g, and sealing of the opening and the like were performed, thereby assembling a cylindrical nonaqueous electrolyte secondary battery. Table 6 shows the total amount of adhesive polymers per 100 mAh battery capacity.

The secondary batteries of Example 13 and Comparative Example 4 were subjected to a charge/discharge test in a 20° C. atmosphere such that each secondary battery was charged to 4.2v for 3 hr by a charging current of 800 mA and discharged to 2.7V by 800 mA. Table 6 shows the discharge capacity (initial charge) on the first cycle and the capacity maintenance ratio (with respect to the initial capacity) on the 300th cycle in this charge/discharge cycle test.

Additionally, after the secondary batteries of Examples 13 and Comparative Example 4 were charged to 4.2V for 3 hr by a charging current of 800 mA and discharged to 2.7V by 2C, the discharge capacity was measured, and the 2C discharge rate capacity maintenance ratio (the ratio of the 2C discharge capacity to the initial capacity) was calculated. The results are also shown in Table 6.

TABLE 6

| | Total amount of adhesive polymer (mg) | Initial capacity (mAh) | Capacity maintenance ratio after 300 cycles (%) | 2C discharge rate capacity maintenance ratio (%) |
|---|---|---|---|---|
| Example 13 | 0.23 | 1800 | 95 | 90 |
| Comparative Example 4 | 0 | 1600 | 85 | 80 |

As Table 6 shows, the secondary battery of Example 13 made the use of a thin separator possible and superior in initial capacity, cycle life, and large discharge characteristic, compared with the secondary battery of Comparative Example 4.

Also, in the above example 13 the present invention was applied to a cylindrical nonaqueous electrolyte secondary battery including a metal closed-end cylindrical vessel. However, the present invention is similarly applicable to a rectangular nonaqueous electrolyte secondary battery including a metal closed-end rectangular vessel.

EXAMPLE 14

<Manufacture of Positive Electrode>

First, 91 wt % of a lithium cobalt oxide ($Li_xCoO_2: 0 \leq X \leq 1$) powder, 3.5 wt % of acetylene black, 3.5 wt % of graphite, 2 wt % of an ethylenepropylenediene monomer (EPDM) powder as a binder, and toluene were mixed. The two surfaces of a collector made of a porous aluminum foil (15 $\mu$m thick) having 0.5 mm diameter pores at a ratio of 10 pores per 10 cm$^2$ were coated with the resultant mixture. This collector was pressed to manufacture a positive electrode having an electrode density of 3 g/cm$^3$.

<Manufacture of Negative Electrode>

93 wt % of a powder of mesophase pitch-based carbon fibers heat-treated at 3,000° C. (fiber diameter=8 $\mu$m, average fiber length=20 $\mu$m, and average interplanar spacing ($d_{002}$)=0.3360 nm) as a carbonaceous material and 7 wt % of polyvinylidene fluoride (PVdF) as a binder were mixed. A collector made of a porous copper foil (15 $\mu$m thick) having 0.5 mm diameter pores at a ratio of 10 pores per 10 cm$^2$ was coated with the resultant mixture. This collector was dried and pressed to manufacture a negative electrode having an electrode density of 1.3 g/cm$^3$.

<Separator>

A separator made of a porous polyethylene film which had a thickness of 25 $\mu$m, a heat shrinkage of 20% upon being left to stand at 120° C. for 1 hr, and a porosity of 50% was prepared. The dimension in the longitudinal direction of this separator was longer by 2 mm than the positive electrode and by 1.5 mm than the negative electrode. The dimension perpendicular to the longitudinal direction of the separator was longer by 2 mm than the positive electrode and by 1.5 mm than the negative electrode.

<Preparation of Nonaqueous Electrolyte>

A nonaqueous electrolyte was prepared by dissolving 1 mol/l of lithium hexafluorophosphate (LiPF$_6$) in a solvent mixture (mixing volume ratio 1:2) of ethylene carbonate (EC) and methylethyl carbonate (MEC).

<Manufacture of Electrode Group>

A band-like positive electrode lead was welded to the collector of the positive electrode, and a band-like negative electrode lead was welded to the collector of the negative electrode. Subsequently, the positive electrode, negative electrode, and separator were stacked in the order of the separator, positive electrode, separator, and negative electrode. The obtained stack was spirally wound such that the separator was the outermost layer. The spiral or coil was molded into a flat shape to manufacture an electrode group. In this electrode group, the negative electrode protruded more than the positive electrode, and the separator protruded more than the negative electrode. The protrusion length of each end portion of the separator was 1 mm when measured from each end portion of the positive electrode, and was 0.75 mm when measured from each end portion of the negative electrode.

A 100 $\mu$m thick laminate film formed by covering the two surfaces of an aluminum foil with polypropylene was molded into a bag shape. The electrode group was housed in this bag such that the stacked section was seen through the opening of the bag. 0.5 wt % of polyacrylonitrile (PAN) as an adhesive polymer was dissolved in dimethylformamide (boiling point=153° C.) as an organic solvent. The resultant solution was injected into the electrode group in the laminate film such that the amount per 100 mAh battery capacity was 0.25 ml. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymers per 100 mAh battery capacity. Note that the total amount of adhesive polymers per 100 mAh battery capacity was calculated from an increase in the weight from that of the electrode group before impregnating the electrode group with the adhesive polymer solution.

The nonaqueous electrolyte was injected into the electrode group in the laminate film such that the amount per 1 Ah battery capacity was 4.1 g (0.41 g per 100 mAh), thereby assembling a thin nonaqueous electrolyte secondary battery 3 mm thick, 40 mm wide, and 70 mm high.

EXAMPLE 15

A thin nonaqueous electrolyte secondary battery was assembled following the same procedures as in Example 14 except that aluminum was used as the negative electrode.

EXAMPLE 16

An electrode group manufactured in the same manner as in Example 14 was housed in a molded laminate film bag such that the stacked section was seen through the opening of the bag. 0.5 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 40° C. for 24 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

EXAMPLE 17

A thin nonaqueous electrolyte secondary battery was assembled following the same procedures as in Example 16 except that the vacuum drying conditions were 80° C. and 12 hr.

EXAMPLE 18

A thin nonaqueous electrolyte secondary battery was assembled following the same procedures as in Example 16 except that the vacuum drying conditions were 100° C. and 6 hr.

EXAMPLE 19

A thin nonaqueous electrolyte secondary battery was assembled following the same procedures as in Example 16 except that aluminum was used as the negative electrode.

EXAMPLE 20

An electrode group manufactured in the same manner as in Example 14 was housed in a molded laminate film bag such that the stacked section was seen through the opening of the bag. 0.1 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

EXAMPLE 21

An electrode group manufactured in the same manner as in Example 14 was housed in a molded laminate film bag such that the stacked section was seen through the opening of the bag. 1 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

EXAMPLE 22

An electrode group manufactured in the same manner as in Example 14 was housed in a molded laminate film bag such that the stacked section was seen through the opening of the bag. 2.5 wt % of polyvinylidene fluoride (PVdF) as an adhesive polymer were dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

EXAMPLE 23

An electrode group manufactured in the same manner as in Example 14 was housed in a molded laminate film bag such that the stacked section was seen through the opening of the bag. 1 wt % of polyacrylate (PMMA) as an adhesive polymer was dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

EXAMPLE 24

An electrode group manufactured in the same manner as in Example 14 was housed in a molded laminate film bag such that the stacked section was seen through the opening of the bag. 0.5 wt % of polyvinyl chloride (PVC) as an adhesive polymer was dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

EXAMPLE 25

An electrode group manufactured in the same manner as in Example 14 was housed in a molded laminate film bag such that the stacked section was seen through the opening of the bag. 0.5 wt % of polyethylene oxide (PEO) as an adhesive polymer was dissolved in dimethylformamide (boiling point=153° C.) as an organic solvent. The resultant solution was injected into the electrode group in the laminate film such that the amount per 100 mAh battery capacity was the same as in Example 14. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. Table 8 shows the total amount of adhesive polymer per 100 mAh battery capacity.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

COMPARATIVE EXAMPLE 5

An electrode group manufactured in the same manner as in Example 14 was housed in a molded laminate film bag such that the stacked section was seen through the opening of the bag. This electrode group was vacuum-dried at 80° C. for 12 hr. The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

COMPARATIVE EXAMPLE 6

A separator was manufactured by impregnating nonwoven fabric with a gel electrolyte (prepared by mixing polyacrylonitrile (PAN), $LiPF_6$, EC, and MEC at a molar ratio of $PAN:LiPF_6:EC:MEC=16:5:55:24$) instead of a nonaqueous electrolyte.

Positive and negative electrodes identical with those explained in Example 14 were spirally wound with this separator interposed between them. The coil was molded into a flat shape to manufacture an electrode group. This electrode group was housed in a molded laminate film bag such that the stacked section was seen through the opening of the bag. The electrode group was then vacuum-dried at 80° C. for 12 hr. The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high.

COMPARATIVE EXAMPLE 7

3 wt % of polyvinylidene fluoride (PVdF) as an adhesive polymer were dissolved in dimethylformamide (boiling point=153° C.) as an organic solvent. The two surfaces of a separator identical with that explained in Example 14 were coated with the resultant solution. A stack was manufactured by interposing this separator between positive and negative electrodes identical with those explained in Example 14. This stack was vacuum-dried at 80° C. for 12 hr to form a porous adhesive layer between the positive electrode and the separator and between the negative electrode and the separator. The resultant stack was spirally wound, and the coil was molded into a flat shape to manufacture an electrode group.

The nonaqueous electrolyte described earlier was injected into the electrode group in the laminate film such that the amount per 1 Ah battery capacity was the same as in Example 14, thereby assembling a thin nonaqueous electrolyte secondary battery 3 mm thick, 40 mm wide, and 70 mm high. The concentration of the adhesive polymer in the separator was measured and 15 wt %.

A charge/discharge cycle test was conducted in a 20° C. atmosphere on the secondary batteries of Examples 14, 16 to 18, and 20 to 25 and Comparative Examples 5 to 7 such that each secondary battery was charged to 4.2V for 5 hr by a charging current of 300 mA and discharged to 2.7V by 300 mA. The secondary batteries of Examples 15 and 19 were subjected to a charge/discharge cycle test in a 20° C. atmosphere such that each secondary battery was charged to 4.0V for 5 hr by a charging current of 300 mA and discharged to 2.7V by 300 mA. Table 9 below shows the discharge capacity (initial capacity) on the first cycle and the capacity maintenance ratio (with respect to the initial capacity) on the 300th cycle in each charge/discharge cycle test.

Also, after the batteries of Examples 14, 16 to 18, and 20 to 25 and Comparative Examples 5 to 7 were charged to 4.2V for 5 hr by a charging current of 300 mV and discharged to 2.7V by 2C, the discharge capacity of each battery was measured, and the ratio of this 2C discharge capacity to the initial capacity was calculated. Table 9 below shows the results as the 2C discharge rate capacity maintenance ratio. Meanwhile, the secondary batteries of Examples 15 and 19 were charged to 4.0V for 5 hr by a charging current of 300 mA and discharged to 2.7V by 2C, the discharge capacity of each battery was measured, and the 2C discharge rate capacity maintenance ratio was calculated. The results are also shown in Table 9.

TABLE 7

| | Type of adhesive polymer | Concentration (%) of adhesive polymer insolution | Temperature (° C.) of vacuum drying | Negative electrode |
|---|---|---|---|---|
| Example 14 | PAN | 0.5 | 80 | Carbonaceous material |
| Example 15 | PAN | 0.5 | 80 | Al |
| Example 16 | PVdF | 0.5 | 40 | Carbonaceous material |
| Example 17 | PVdF | 0.5 | 80 | Carbonaceous material |
| Example 18 | PVdF | 0.5 | 100 | Carbonaceous material |
| Example 19 | PVdF | 0.5 | 80 | Al |
| Example 20 | PVdF | 0.1 | 80 | Carbonaceous material |
| Example 21 | PVdF | 1 | 80 | Carbonaceous material |
| Example 22 | PVdF | 2.5 | 80 | Carbonaceous material |
| Example 23 | PMMA | 0.5 | 80 | Carbonaceous material |
| Example 24 | PVC | 0.5 | 80 | Carbonaceous material |
| Example 25 | PEO | 0.5 | 80 | Carbonaceous material |
| Comparative Example 5 | No adhesive polymer (nonaqueous electrolyte) | | | Carbonaceous material |
| Comparative Example 6 | No adhesive polymer (gel electrolyte) | | | Carbonaceous material |
| Comparative Example 7 | PVdF | 3.0 | 80 | Carbonaceous material |

TABLE 8

| | Total amount of adhesive polymer (mg) |
|---|---|
| Example 14 | 1.25 |
| Example 15 | 1.25 |
| Example 16 | 1.15 |
| Example 17 | 1.15 |
| Example 18 | 1.15 |
| Example 19 | 1.15 |
| Example 20 | 0.23 |
| Example 21 | 2.3 |
| Example 22 | 2.88 |
| Example 23 | 1.15 |
| Example 24 | 1.15 |
| Example 25 | 1.15 |

TABLE 9

| | Initial capacity (mAh) | Capacity maintenance ratio after 300 cycles (%) | 2C discharge rate capacity maintenance ratio (%) |
|---|---|---|---|
| Example 14 | 600 | 80 | 75 |
| Example 15 | 550 | 75 | 70 |
| Example 16 | 550 | 75 | 75 |

TABLE 9-continued

|  | Initial capacity (mAh) | Capacity maintenance ratio after 300 cycles (%) | 2C discharge rate capacity maintenance ratio (%) |
|---|---|---|---|
| Example 17 | 620 | 90 | 85 |
| Example 18 | 600 | 80 | 60 |
| Example 19 | 550 | 75 | 70 |
| Example 20 | 600 | 70 | 90 |
| Example 21 | 600 | 85 | 70 |
| Example 22 | 550 | 70 | 50 |
| Example 23 | 600 | 85 | 70 |
| Example 24 | 500 | 80 | 70 |
| Example 25 | 400 | 80 | 70 |
| Comparative Example 5 | 50 | 0 | 0 |
| Comparative Example 6 | 400 | 70 | 40 |
| Comparative Example 7 | 450 | 30 | 50 |

As is apparent from Tables 7 to 9, the secondary batteries of Examples 14 to 25 were superior in initial capacity and cycle life. In particular, the 2C large discharge capacity greatly improved compared with the secondary batteries of Comparative Examples 5 to 7.

By contrast, the secondary battery of Comparative Example 5 was far inferior to Examples 14 to 25 in initial capacity, cycle life, and large discharge capacity. The secondary battery of Comparative Example 6 was inferior to the secondary batteries of Examples 14 to 25 in 2C large current discharge capacity. The secondary battery of Comparative Example 7 was inferior to Examples 14 to 25 in initial capacity, cycle life, and large discharge capacity.

The above examples 14 to 25 used the electrode group having a structure in which the positive electrode, negative electrode, and separator were spirally wound and the coil was compressed in the direction of diameter. A thin nonaqueous electrolyte secondary battery was assembled which was identical with that of Example 17 except that the structure of an electrode group was changed to that shown in FIG. 5, i.e., positive and negative electrodes were folded five times with a separator interposed between them such that the opposing surfaces of the negative electrode contacted each other. Consequently, the battery capacity reduced by about 10% from that in Example 17, but the rest of the performance was equivalent to that in Example 17.

EXAMPLE 26

Following the same procedures as explained in Example 12-1, an electrode group was manufactured and housed in a laminate film. Next, without injecting any adhesive polymer solution, the laminate film was pressed with a pressure of 10 kg/cm$^2$ in the direction of thickness of the electrode group in a high-temperature environment at 80° C. which was vacuumed. In this manner, an electrode group whose $L_2/L_1$ was 1.00 was manufactured.

The nonaqueous electrolyte described earlier was injected into this electrode group in the laminate film such that the amount per 1 Ah battery capacity was the same as in Example 1, thereby assembling a thin nonaqueous electrolyte secondary battery 3 mm thick, 40 mm wide, and 70 mm high. The content of the adhesive polymer in the electrode group was 0 wt %. Examples 27–33 &

COMPARATIVE EXAMPLE 8

Thin nonaqueous electrolyte secondary batteries were assembled following the same procedures as in Example 26 except that the $L_2/L_1$ was set as shown in Table 10 below by changing the pressure.

COMPARATIVE EXAMPLE 9

Following the same procedures as explained in Example 12-1, an electrode group was manufactured and housed in a laminate film. Next, without injecting any adhesive polymer solution, the laminate film was pressed with a pressure of 0.001 kg/cm$^2$ in the direction of thickness of the electrode group in an atmosphere at 25° C. which was vacuumed. In this manner, an electrode group whose $L_2/L_1$ was 1.30 was manufactured.

The nonaqueous electrolyte was injected into this electrode group in the laminate film such that the amount per 1 Ah battery capacity was the same as in Example 1, thereby assembling a thin nonaqueous electrolyte secondary battery 3 mm thick, 40 mm wide, and 70 mm high.

EXAMPLE 34

A thin nonaqueous electrolyte secondary battery was assembled following the same procedures as in Example 26 except that the air permeability of the porous polyethylene film was 580 sec/100 cm$^3$.

EXAMPLE 35

A thin nonaqueous electrolyte secondary battery was assembled following the same procedures as in Example 26 except that the air permeability of the porous polyethylene film was 400 sec/100 cm$^3$.

EXAMPLE 36

A thin nonaqueous electrolyte secondary battery was assembled following the same procedures as in Example 26 except that the air permeability of the porous polyethylene film was 150 sec/100 cm$^3$.

The internal impedances at 1 kHz of the secondary batteries of Examples 26 to 36 and Comparative Examples 8 and 9 were measured. Table 10 below shows the results. Also, a charge/discharge cycle test was conducted under the same conditions as Example 1. Table 10 shows the discharge capacity (initial capacity) on the first cycle and the capacity maintenance ratio (with respect to the initial capacity) on the 300th cycle.

TABLE 10

|  | Pressure (kg/cm$^2$) | $L_2/L_1$ | Impedance (mΩ) | Capacity (mAh) | Capacity maintenance ratio after 300 cycles (%) |
|---|---|---|---|---|---|
| Example 26 | 10 | 1.00 | 60 | 620 | 90 |
| Example 27 | 20 | 0.90 | 56 | 610 | 85 |
| Example 28 | 15 | 0.95 | 60 | 620 | 90 |
| Example 29 | 5 | 1.02 | 61 | 620 | 90 |
| Example 30 | 1.5 | 1.06 | 70 | 620 | 88 |
| Example 31 | 0.6 | 1.10 | 73 | 610 | 85 |
| Example 32 | 0.5 | 1.15 | 75 | 595 | 80 |
| Example 33 | 0.4 | 1.20 | 78 | 590 | 75 |
| Example 34 | 10 | 1.05 | 80 | 520 | 70 |
| Example 35 | 10 | 1.02 | 75 | 570 | 75 |
| Example 36 | 10 | 1.01 | 70 | 590 | 80 |
| Comparative Example 8 | 25 | 0.85 | 90 | 400 | 60 |
| Comparative Example 9 | 0.001 | 1.30 | 120 | 500 | 20 |

As can be seen from Table 10, the secondary batteries of Examples 26 to 36 each including an electrode group whose $L_2/L_1$ was 0.90 to 1.20 had lower internal impedances, higher initial capacities, and higher capacity maintenance ratios on the 300th cycle than those of the secondary batteries of Comparative Examples 8 and 9 each including an electrode group whose $L_2/L_1$ fell outside the above range.

EXAMPLE 37

Positive and negative electrodes identical with those explained in Example 1 were folded six times with a separator identical with that explained in Example 12-1 interposed between them such that the opposing surfaces of the negative electrode contacted each other, thereby manufacturing an electrode group. This electrode group was housed in a laminate film bag identical with that explained in Example 1 such that the stacked section was seen through the opening.

Next, the laminate film was pressed with a pressure of 10 kg/cm² in the direction of thickness of the electrode group in a high-temperature environment at 80° C. which was vacuumed. In this manner, an electrode whose $L_4/L_3$ was 1.00 was manufactured.

The nonaqueous electrolyte described earlier was injected into this electrode group in the laminate film such that the amount per 1 Ah battery capacity was the same as in Example 1, thereby assembling a thin nonaqueous electrolyte secondary battery 3 mm thick, 40 mm wide, and 70 mm high. The content of the adhesive polymer in the electrode group was 0 wt %. Examples 38–44 & Comparative Example 10.

Thin nonaqueous electrolyte secondary batteries were assembled following the same procedures as in Example 37 except that the $L_4/L_3$ was set as shown in Table 11 below by changing the pressure.

COMPARATIVE EXAMPLE 11

Following the same procedures as explained in Example 37, an electrode group was manufactured and housed in a laminate film. Next, without injecting any adhesive polymer solution, the laminate film was pressed with a pressure of 0.001 kg/cm² in the direction of thickness of the electrode group in an environment at 25° C. which was vacuumed. In this manner, an electrode group whose $L_4/L_3$ was 1.30 was manufactured.

The nonaqueous electrolyte was injected into this electrode group in the laminate film such that the amount per 1 Ah battery capacity was the same as in Example 1, thereby assembling a thin nonaqueous electrolyte secondary battery 3 mm thick, 40 mm wide, and 70 mm high.

EXAMPLE 45

A thin nonaqueous electrolyte secondary battery was assembled following the same procedures as in Example 37 except that the air permeability of the porous polyethylene film was 580 sec/100 cm³.

EXAMPLE 46

A thin nonaqueous electrolyte secondary battery was assembled following the same procedures as in Example 37 except that the air permeability of the porous polyethylene film was 400 sec/100 cm³.

EXAMPLE 47

A thin nonaqueous electrolyte secondary battery was assembled following the same procedures as in Example 37 except that the air permeability of the porous polyethylene film was 150 sec/100 cm³.

The internal impedances at 1 kHz of the secondary batteries of Examples 37 to 47 and Comparative Examples 10 and 11 were measured. Table 11 below shows the results. Also, a charge/discharge cycle test was conducted under the same conditions as Example 1. Table 11 shows the discharge capacity (initial capacity) on the first cycle and the capacity maintenance ratio (with respect to the initial capacity) on the 300th cycle.

TABLE 11

| | Pressure (kg/cm²) | $L_4/L_3$ | Impedance (mΩ) | Capacity (mAh) | Capacity maintenance ratio after 300 cycles (%) |
|---|---|---|---|---|---|
| Example 37 | 10 | 1.00 | 60 | 600 | 90 |
| Example 38 | 20 | 0.90 | 56 | 590 | 85 |
| Example 39 | 15 | 0.95 | 60 | 600 | 90 |
| Example 40 | 5 | 1.02 | 61 | 600 | 90 |
| Example 41 | 1.5 | 1.06 | 70 | 600 | 88 |
| Example 42 | 0.7 | 1.10 | 73 | 590 | 85 |
| Example 43 | 0.6 | 1.15 | 75 | 575 | 80 |
| Example 44 | 0.5 | 1.20 | 78 | 570 | 75 |
| Example 45 | 10 | 1.05 | 80 | 500 | 72 |
| Example 46 | 10 | 1.02 | 76 | 540 | 76 |
| Example 47 | 10 | 1.01 | 72 | 575 | 82 |
| Comparative Example 10 | 25 | 0.85 | 90 | 400 | 60 |
| Comparative Example 11 | 0.001 | 1.30 | 120 | 500 | 20 |

As can be seen from Table 11, the secondary batteries of Examples 37 to 47 each including an electrode group whose $L_4/L_3$ was 0.90 to 1.20 had lower internal impedances, higher initial capacities, and higher capacity maintenance ratios on the 300th cycle than those of the secondary batteries of Comparative Examples 10 and 11 each including an electrode group whose $L_4/L_3$ fell outside the above range.

EXAMPLE 48

An electrode group manufactured in the same manner as explained in Example 12-1 was housed in a molded laminate film bag such that the stacked section was seen through the opening. Meanwhile, 0.5 wt % of polyvinylidene fluoride (PVdF) as an adhesive polymer were dissolved in dimethylformamide (boiling point=153° C.) as an organic solvent. The solution was injected into the electrode group in the laminate film such that the amount per 100 mAh battery capacity was 0.2 ml. In this manner, the solution was allowed to penetrate into the electrode group and adhere to the entire surfaces of the electrode group.

Next, the laminate film was pressed with a pressure of 1.5 kg/cm² in the direction of thickness of the electrode group in a high-temperature environment at 80° C. which was vacuumed. In this manner, an electrode whose $L_2/L_1$ was 1.02 was manufactured. In this step, the organic solvent was evaporated to adhere the positive electrode, negative electrode, and separator to each other. At the same time, a porous adhesive layer was formed on the surfaces of the electrode group to adhere the electrode group to the inner surfaces of the laminate film.

In this electrode group, the positive electrode and the separator are adhered to each other by adhesive polymers that are dispersedly present in the positive electrode and the separator and in a boundary between the positive electrode and the separator. The negative electrode and the separator are adhered to each other by adhesive polymers that are dispersedly present in the negative electrode and the separator and in a boundary between the negative electrode and the separator.

The nonaqueous electrolyte described earlier was injected into the electrode group in the laminate film such that the amount per 1 Ah battery capacity was the same as in Example 1, thereby assembling a thin nonaqueous electrolyte secondary battery 3 mm thick, 40 mm wide, and 70 mm high.

EXAMPLE 49

A thin nonaqueous electrolyte secondary battery was assembled following the same procedures as in Example 48 except that molding was performed by forcing into a mold.

A charge/discharge cycle test was performed on the secondary batteries of Examples 48 and 49 under the same conditions as Example 1. Table 12 shows the discharge capacity (initial capacity) on the first cycle and the capacity maintenance ratio (with respect to the initial capacity) on the 300th cycle in this charge/discharge cycle test. Also, the 2C discharge rate capacity maintenance ratios of the secondary batteries of Examples 48 and 49 were calculated under the same conditions as Example 1. The results are also shown in Table 12.

TABLE 12

| | Content of separator adhesive polymer (wt %) | Initial capacity (mAh) | Capacity maintenance ratio after 300 cycles (%) | 2C discharge rate capacity maintenance ratio (%) |
| --- | --- | --- | --- | --- |
| Example 48 | 1.0 | 620 | 92 | 90 |
| Example 49 | 1.0 | 620 | 92 | 90 |

As can be seen from Table 12, the secondary batteries of Examples 48 and 49 had higher capacity maintenance ratios after 300 cycles and higher capacity maintenance ratios when discharged by 2C than those of Examples 1 to 12 and 14 to 47.

EXAMPLE 50

Positive and negative electrodes identical with those explained in Example 14 were prepared. A porous polyethylene film identical with that explained in Example 12-1 was prepared. The dimension in the longitudinal direction of this separator was longer by 2 mm than the positive electrode and by 1.5 mm than the negative electrode. The dimension perpendicular to the longitudinal direction of the separator was longer by 2 mm than the positive electrode and by 1.5 mm than the negative electrode.
<Manufacture of electrode group>

1 wt % of polyacrylonitrile (PAN) as an adhesive polymer was dissolved in a dimethylformamide (boiling point=153° C.) solution. The positive electrode layer surface of the positive electrode and the negative electrode layer surface of the negative electrode were coated with the resultant solution. The separator was placed between these positive and negative electrode layer surfaces. The obtained stack was vacuum-dried at 80° C. for 12 hr to evaporate the dimethylformamide and form porous adhesive layers between the electrode layers and the separator, thereby manufacturing an electrode group. In this electrode group, the negative electrode protruded more than the positive electrode, and the separator protruded more than the negative electrode. The protrusion length of each end portion of the separator was 1 mm when measured from each end portion of the positive electrode, and was 0.75 mm when measured from each end portion of the negative electrode. The PAN content in the separator was as shown in Table 13 (to be presented later).

The electrode group was housed in a 100 μm thick laminate film formed by covering the two surfaces of an aluminum foil with polypropylene was molded into a bag shape. A nonaqueous electrolyte identical with that explained in Example 1 was injected into the electrode group such that the amount per 1 Ah battery capacity was 4.1 g (0.41 g per 100 mAh), thereby assembling a thin nonaqueous electrolyte secondary battery 3 mm thick, 40 mm wide, and 70 mm high, having the structure shown in FIG. 10 described earlier.

EXAMPLES 51–54

Thin nonaqueous electrolyte secondary batteries were assembled following the same procedures as in Example 50 except that polymers shown in Table 13 were used as the adhesive polymer.

EXAMPLE 55

A thin nonaqueous electrolyte secondary battery was manufactured following the same procedures as in Example 50 except that a negative electrode made of a 0.1-mm thick aluminum plate was used.

EXAMPLE 56

A thin nonaqueous electrolyte secondary battery was manufactured following the same procedures as in Example 50 except that content of PAN in the separator was 0.4 wt %.

EXAMPLE 57

A thin nonaqueous electrolyte secondary battery was manufactured following the same procedures as in Example 50 except that content of PAN in the separator was 0.3 wt %.

COMPARATIVE EXAMPLE 12

3 wt % of polyvinylidene fluoride (PVdF) as an adhesive polymer were dissolved in dimethylformamide (boiling point=153° C.). The two surfaces of a separator identical with that explained in Example 50 were coated with the resultant solution. A stack was manufactured by interposing this separator between positive and negative electrodes identical with those explained in Example 50. This stack was vacuum-dried at 80° C. for 12 hr to form porous adhesive layers between the positive electrode and the separator and between the negative electrode and the separator. In this electrode group, the negative electrode protruded more than the positive electrode, and the separator protruded more than the negative electrode. The protrusion length of each end portion of the separator was 1 mm when measured from each end portion of the positive electrode, and was 0.75 mm when measured from each end portion of the negative electrode. The PVdF content in the separator was as shown in Table 13.

A thin nonaqueous electrolyte secondary battery 3 mm thick, 40 mm wide, and 70 mm high was assembled following the same procedures as explained in Example 50 except that this electrode group was used.

COMPARATIVE EXAMPLE 13

A thin nonaqueous electrolyte secondary battery was assembled following the same procedures as in Comparative Example 12 except that none of the positive electrode, negative electrode, and separator was allowed to protrude by setting the longitudinal and lateral dimensions of the positive electrode, negative electrode, and separator equal to each other.

A charge/discharge cycle test was conducted in a 20° C. atmosphere on the secondary batteries of Examples 50 to 54 and 56 to 57 and Comparative Examples 12 and 13 such that each secondary battery was charged to 4.2V for 5 hr by a charging current of 300 mA and discharged to 2.7V by 300 mA. The secondary battery of Example 55 was subjected to a charge/discharge cycle test in a 20° C. atmosphere such that the secondary battery was charged to 4.0V for 5 hr by a charging current of 300 mA and discharged to 2.7V by 300 mA. Table 13 shows the discharge capacity (initial capacity) on the first cycle and the capacity maintenance ratio (with respect to the initial capacity) on the 300th cycle in each charge/discharge cycle test.

Also, after the batteries of Examples 50 to 54 and 56 to 57 and Comparative Examples 12 and 13 were charged to 4.2V for 5 hr by a charging current of 300 mV and discharged to 2.7V by 2C, the discharge capacity was measured, and the ratio of this 2C discharge capacity to the initial capacity was calculated. Table 13 shows the results as the 2C discharge rate capacity maintenance ratio. Meanwhile, the secondary battery of Example 55 was charged to 4.0V for 5 hr by a charging current of 300 mA and discharged to 2.7V by 2C, the discharge capacity was measured, and the 2C discharge rate capacity maintenance ratio was calculated. Table 13 also shows this result.

Furthermore, the charged secondary batteries of Examples 50 to 57 and Comparative Examples 12 and 13 were dropped onto a concrete floor from a height of 90 cm. After that, changes in the battery voltage and impedance and the presence/absence of internal short circuit were checked. The results are also shown in Table 13.

lower initial capacity, a lower capacity maintenance ratio after 300 cycles, and a lower capacity maintenance ratio when discharged by 2C than those of Examples 50 to 57. The secondary battery of Comparative Example 13, on the other hand, in which the adhesive polymer content in the separator exceeded 10 wt % and the end portions of the positive electrode, negative electrode, and separator were trued up, produced internal short circuit when dropped and had a lower initial capacity, a lower capacity maintenance ratio after 300 cycles, and a lower capacity maintenance ratio when discharged by 2C than those of

EXAMPLES 50 to 57

As has been described in detail above, the present invention can provide a nonaqueous electrolyte secondary battery which has an improved discharge capacity, cycle performance, and large discharge characteristic and can realize a thin structure having a thickness of 4 mm or less.

The present invention can provide a nonaqueous electrolyte secondary battery manufacturing method capable of improving the discharge capacity, cycle performance, and large discharge characteristic and realizing a thin structure having a thickness of 4 mm or less by a simple method.

The present invention can provide a nonaqueous electrolyte secondary battery which has an improved discharge capacity and cycle characteristic and can realize a thin structure having a thickness of 4 mm or less.

The present invention can provide a nonaqueous electrolyte secondary battery manufacturing method capable of improving the discharge capacity and cycle characteristic and realizing a thin structure having a thickness of 4 mm or less by a simple method.

The present invention can provide a nonaqueous electrolyte secondary battery which can reduce the internal short

TABLE 13

| | Type of adhesive polymer | Content of separator adhesive polymer (wt %) | Initial capacity (mAh) | Capacity maintenance ratio after 300 cycles (%) | 2c discharge rate capacity maintenance ratio (%) | Internal short circuit occurrence frequency (%) |
|---|---|---|---|---|---|---|
| Example 50 | PAN | 0.5 | 600 | 85 | 80 | 0 |
| Example 51 | PVdF | 0.5 | 650 | 90 | 80 | 0 |
| Example 52 | PMMA | 0.5 | 600 | 85 | 80 | 0 |
| Example 53 | PVC | 0.5 | 600 | 75 | 70 | 0 |
| Example 54 | PEO | 0.5 | 550 | 70 | 60 | 0 |
| Example 55 | PAN | 0.5 | 500 | 85 | 80 | 0 |
| Example 56 | PAN | 0.4 | 550 | 75 | 60 | 0 |
| Example 57 | PAN | 0.3 | 500 | 70 | 50 | 0 |
| Comparative Example 12 | PVdF | 12 | 300 | 20 | 30 | 0 |
| Comparative Example 13 | PVdF | 12 | 280 | 0 | 30 | 100 |

As Table 13 shows, the secondary batteries of Examples 50 to 57, in each of which the content of the adhesive polymer in the separator was 10 wt % or less and the separator end portions protruded compared with the positive and negative electrodes, did not produce any internal short circuits when they were dropped, and had high initial capacities, high capacity maintenance ratios after 300 cycles, and high capacity maintenance ratios when discharged by 2C.

Conversely, although the secondary battery of Comparative Example 12 in which the adhesive polymer content in the separator exceeded 10 wt % did not produce internal short circuit when dropped, this secondary battery had a circuit occurrence ratio when a shock is applied, improve the discharge capacity and cycle characteristic, and realize a thin structure having a thickness of 4 mm or less.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery comprising:
   an electrode group having a structure formed by spirally winding a positive electrode and a negative electrode with a separator interposed therebetween and compressing a resultant coil in a direction of diameter;
   a nonaqueous electrolyte with which said electrode group is impregnated; and
   a film jacket housing said electrode group and formed of a laminate film comprising a metal layer and a flexible synthetic resin layer formed on at least a portion of said metal layer,
   wherein a surface of said electrode group to which a stacked structure is exposed has a shape satisfying Formula (1) below in a charged state:

$$0.9 \leq L_2/L_1 \leq 1.2 \tag{1}$$

wherein $L_2$ is a thickness of a most multilayered portion in a region of the surface except curved-layer-regions and $L_1$ is a thickness of an end portion which is one of end portions of the region except the curved-layer-regions and is equal in number of layers of $L_2$.

2. The secondary battery according to claim 1, wherein said separator is made from a porous sheet having an air permeability of 600 sec/100 cm³ or less.

3. The secondary battery according to claim 1, wherein said separator is made from at least one type of material selected from polyolefin and cellulose.

4. The secondary battery according to claim 1, wherein said negative electrode contains a carbonaceous material having a graphite crystal in which an interplanar spacing $d_{002}$ derived from (002) reflection is 0.340 nm or less.

5. The secondary battery according to claim 1, wherein said $L_2/L_1$ falls within a range of 0.95 to 1.1.

6. The secondary battery according to claim 1, wherein said electrode group is formed by a method which comprises compressing a coil while applying heat thereto, said coil being formed by spirally or flatly winding said positive electrode and said negative electrode with said separator interposed therebetween, whereby a surface of said coil is formed into a shape satisfying Formula (1).

7. The secondary battery according to claim 6, wherein said heat is applied at a temperature within a range of 40–120° C.

8. The secondary battery according to claim 1, wherein said surface of said electrode group has a shape satisfying Formula (1) in a charged state and a discharged state.

9. A secondary battery according to claim 1, wherein a thickness of said laminate film falls within a range of 50–300 µm.

10. A secondary battery according to claim 1, wherein said metal layer contains aluminum and said flexible synthetic resin layer contains polyethylene, polypropyrene, or polyethylene and polypropyrene.

11. A nonaqueous electrolyte secondary battery comprising:
    an electrode group having a structure formed by folding a stack comprising a positive electrode, a negative electrode, and a separator not less than twice;
    a nonaqueous electrolyte with which said electrode group is impregnated; and
    a film jacket housing said electrode group and formed of a laminate film comprising a metal layer and a flexible synthetic resin layer formed on at least a portion of said metal layer,
    wherein a surface of said electrode group to which a stacked structure is exposed has a shape satisfying Formula (2) below in a charged state:

$$0.9 \leq L_4/L_3 \leq 1.2 \tag{2}$$

wherein $L_4$ is a thickness of a most multilayered portion in a region of the surface except folded-layer-regions and $L_3$ is a thickness of an end portion which is one of end portions of the region except the folded-layer-regions and is equal in number of layers to $L_4$.

12. The secondary battery according to claim 11, wherein said separator is made from a porous sheet having an air permeability of 600 sec/100 cm³ or less.

13. The secondary battery according to claim 11, wherein said separator is made from at least one type of material selected from polyolefin and cellulose.

14. The secondary battery according to claim 11, wherein said $L_4/L_3$ falls within a range of 0.95 and 1.1.

15. The secondary battery according to claim 11, wherein said electrode group is formed by a method which comprises compressing a coil while applying heat thereto, said coil being formed by spirally or flatly winding said positive electrode and said negative electrode with said separator interposed therebetween, whereby said surface of said coil is formed into a shape satisfying Formula (2).

16. The secondary battery according to claim 10, wherein said heat is applied at a temperature within a range of 40–120° C.

17. The secondary battery according to claim 11, wherein said surface of said electrode group has a shape satisfying Formula (2) in a charged state and a discharged state.

18. A secondary battery according to claim 11, wherein a thickness of said laminate film falls within a range of 50–300 µm.

19. A secondary battery according to claim 11, wherein said metal layer contains aluminum and said flexible synthetic resin layer contains polyethylene, polypropyrene, or polyethylene and polypropyrene.

20. A nonaqueous electrolyte secondary battery comprising:
    an electrode group having a structure formed by spirally winding a positive electrode and a negative electrode with a separator interposed therebetween and compressing a resultant coil in a direction of diameter;
    a nonaqueous electrolyte with which said electrode group is impregnated; and
    a film jacket housing said electrode group and formed of a laminate film comprising a metal layer and a flexible synthetic resin layer formed on at least a portion of said metal layer,
    wherein said positive electrode and said separator are adhered to each other by adhesive polymers that are dispersedly present in said positive electrode and said separator and in a boundary between said positive electrode and said separator, and said negative electrode and said separator are adhered to each other by adhesive polymers that are dispersedly present in said negative electrode and said separator and in a boundary between said negative electrode and said separator, and
    a surface of said electrode group to which a stacked structure is exposed has a shape satisfying Formula (1) below in a charged state:

$$0.9 \leq L_2/L_1 \leq 1.2 \tag{1}$$

wherein $L_2$ is a thickness of a most multilayered portion in a region of the surface except curved-layer-regions and $L_1$ is a thickness of an end portion which is one of end portions of the region except the curved-layer-regions and is equal in number of layers to $L_2$.

21. The secondary battery according to claim 20, wherein said adhesive polymer contains at least one polymer selected from the group consisting of polyacrylonitrile, polyacrylate, polyvinylidene fluoride, polyvinyl chloride, and polyethylene oxide.

22. The secondary battery according to claim 20, wherein a content of the adhesive polymer in said separator falls within a range of $1 \times 10^{-5}$ to 10 wt %.

23. The secondary battery according to claim 20, wherein a total amount of the adhesive polymer falls within a range of 0.2 to 6 mg per 100 mAh battery capacity.

24. A nonaqueous electrolyte secondary battery comprising:

an electrode group having a structure formed by folding a stack comprising a positive electrode, a negative electrode, and a separator not less than twice;

a nonaqueous electrolyte with which said electrode group is impregnated; and a film jacket housing said electrode group and formed of a laminate film comprising a metal layer and a flexible synthetic resin layer formed on at least a portion of said metal layer, wherein said positive electrode and said separator are adhered to each other by adhesive polymers that are dispersedly present in said positive electrode and said separator and in a boundary between said positive electrode and said separator, and said negative electrode and said separator are adhered to each other by adhesive polymers that are dispersedly present in said negative electrode and said separator and in a boundary between said negative electrode and said separator, and a surface of said electrode group to which a stacked structure is exposed has a shape satisfying Formula (2) below in a charged state:

$$0.9 \leq L_4/L_3 \leq 1.2 \qquad (2)$$

wherein $L_4$ is a thickness of a most multilayered portion in a region of the surface except folded-layer-regions and $L_3$ is a thickness of an end portion which is one of end portions of the region except the folder-layer-regions and is equal in number of layers to $L_4$.

25. The secondary battery according to claim 24, wherein said adhesive polymer contains at least one polymer selected from the group consisting of polyacrylonitrile, polyacrylate, polyvinylidene fluoride, polyvinyl chloride, and polyethylene oxide.

26. The secondary battery according to claim 24, wherein a content of the adhesive polymer in said separator falls within a range of $1 \times 10^{-5}$ to 10 wt %.

27. The secondary battery according to claim 24, wherein a total amount of the adhesive polymer falls within a range of 0.2 to 6 mg per 100 mAh battery capacity.

28. A nonaqueous electrolyte secondary battery comprising:

an electrode group having a structure formed by spirally winding a positive electrode and a negative electrode with a separator interposed therebetween and compressing a resultant coil in a direction of diameter;

a nonaqueous electrolyte with which said electrode group is impregnated; and a film jacket housing said electrode group and formed of a laminate film comprising a metal layer and a flexible synthetic resin layer formed on at least a portion of said metal layer, wherein each of said positive electrode, said negative electrode and said separator contains an adhesive polymer, and a surface of said electrode group to which a stacked structure is exposed has a shape satisfying Formula (1) below in a charged state:

$$0.9 \leq L_2/L_1 \leq 1.2 \qquad (1)$$

where $L_2$ is a thickness of a most multilayered portion in a region of the surface except curved-layer-regions and $L_1$ is a thickness of an end portion which is one of end portions of the region except the curved-layer-regions and is equal in number of layers of $L_2$.

29. A nonaqueous electrolyte secondary battery comprising:

an electrode group having a structure formed by folding a stack comprising a positive electrode, a negative electrode and a separator not less than twice;

a nonaqueous electrolyte with which said electrode group is impregnated; and a film jacket housing said electrode group and formed of a laminate film comprising a metal layer and a flexible synthetic resin layer formed on at least a portion of said metal layer, wherein each of said positive electrode, said negative electrode and said separator contains an adhesive polymer, and a surface of said electrode group to which a stacked structure is exposed has a shape satisfying Formula (2) below in a charged state:

$$0.9 \leq L_4/L_3 \leq 1.2 \qquad (1)$$

where $L_4$ is a thickness of a most multilayered portion in a region of the surface except folded-layer-regions and $L_3$ is a thickness of an end portion which is one of end portions of the region except the folded-layer-regions and is equal in number of layers of $L_4$.

30. The secondary battery according to claim 7, wherein said surface of the electrode group has a shape satisfying Formula (1) in the charged state where said secondary battery provides a voltage of 2.7 to 4.2V.

31. The secondary battery according to claim 11, wherein said surface of the eletrode group has a shape satisfying Formula (2) in the charged state where said secondary battery provides a voltage of 2.7 to 4.2V.

* * * * *